(12) United States Patent  (10) Patent No.: US 8,848,303 B1
Yamada  (45) Date of Patent: Sep. 30, 2014

(54) DISK STORAGE APPARATUS AND METHOD FOR SERVO DEMODULATION

(71) Applicant: Kabushiki Kaisha Toshiba, Tokyo (JP)

(72) Inventor: Tomoyoshi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/018,212

(22) Filed: Sep. 4, 2013

Related U.S. Application Data

(60) Provisional application No. 61/822,565, filed on May 13, 2013.

(51) Int. Cl.
*G11B 5/02* (2006.01)

(52) U.S. Cl.
USPC .......................... 360/27; 360/77.01

(58) Field of Classification Search
None
See application file for complete search history.

(56) References Cited

U.S. PATENT DOCUMENTS

| | | | |
|---|---|---|---|
| 4,549,232 A | 10/1985 | Axmear et al. |
| 5,689,384 A | 11/1997 | Albrecht et al. |
| 6,046,879 A | 4/2000 | Hampshire |
| 6,067,204 A | 5/2000 | Tremaine |
| 6,590,729 B1 | 7/2003 | Akagi et al. |
| 7,209,314 B2 | 4/2007 | Bandic et al. |
| 7,312,946 B2 | 12/2007 | Asakura et al. |
| 7,440,224 B2 | 10/2008 | Ehrlich et al. |
| 7,457,066 B2 | 11/2008 | Ehrlich et al. |
| 7,529,059 B2 | 5/2009 | Ryu et al. |
| 7,859,787 B2 | 12/2010 | Kisaka |
| 8,023,219 B2 | 9/2011 | Kosugi |
| 8,295,002 B1 | 10/2012 | Katchmart |
| 8,625,230 B2 | 1/2014 | Kosugi et al. |
| 2009/0040641 A1 | 2/2009 | Ehrlich et al. |
| 2012/0293885 A1 | 11/2012 | Kosugi et al. |

FOREIGN PATENT DOCUMENTS

| | | |
|---|---|---|
| JP | 07-065306 | 3/1995 |
| JP | 2000-514585 | 10/2000 |
| JP | 2001-110027 | 4/2001 |
| JP | 2006-309843 | 11/2006 |
| JP | 2009-110597 | 5/2009 |
| JP | 4649421 | 12/2010 |
| JP | 2012-243367 | 12/2012 |
| WO | WO 2008/139603 | 11/2008 |

OTHER PUBLICATIONS

U.S. Appl. No. 14/194,482, filed Feb. 28, 2014, Kabushiki Kaisha Toshiba.

*Primary Examiner* — Paul Huber

(74) *Attorney, Agent, or Firm* — Knobbe, Martens Olson & Bear LLP

(57) ABSTRACT

According to an embodiment, a disk storage apparatus includes a disk with a servo pattern recorded thereon and a processor. The processor offsets a reader in a cross-track direction on the disk and performs a discrete Fourier transform (DFT) operation on an amplitude sequence of readback signals with respect to the cross-track direction. The processor calculates an optimal correction coefficient for a linearity correction function used for a linearity correction of a position error signal based on a result of the DFT operation.

18 Claims, 26 Drawing Sheets

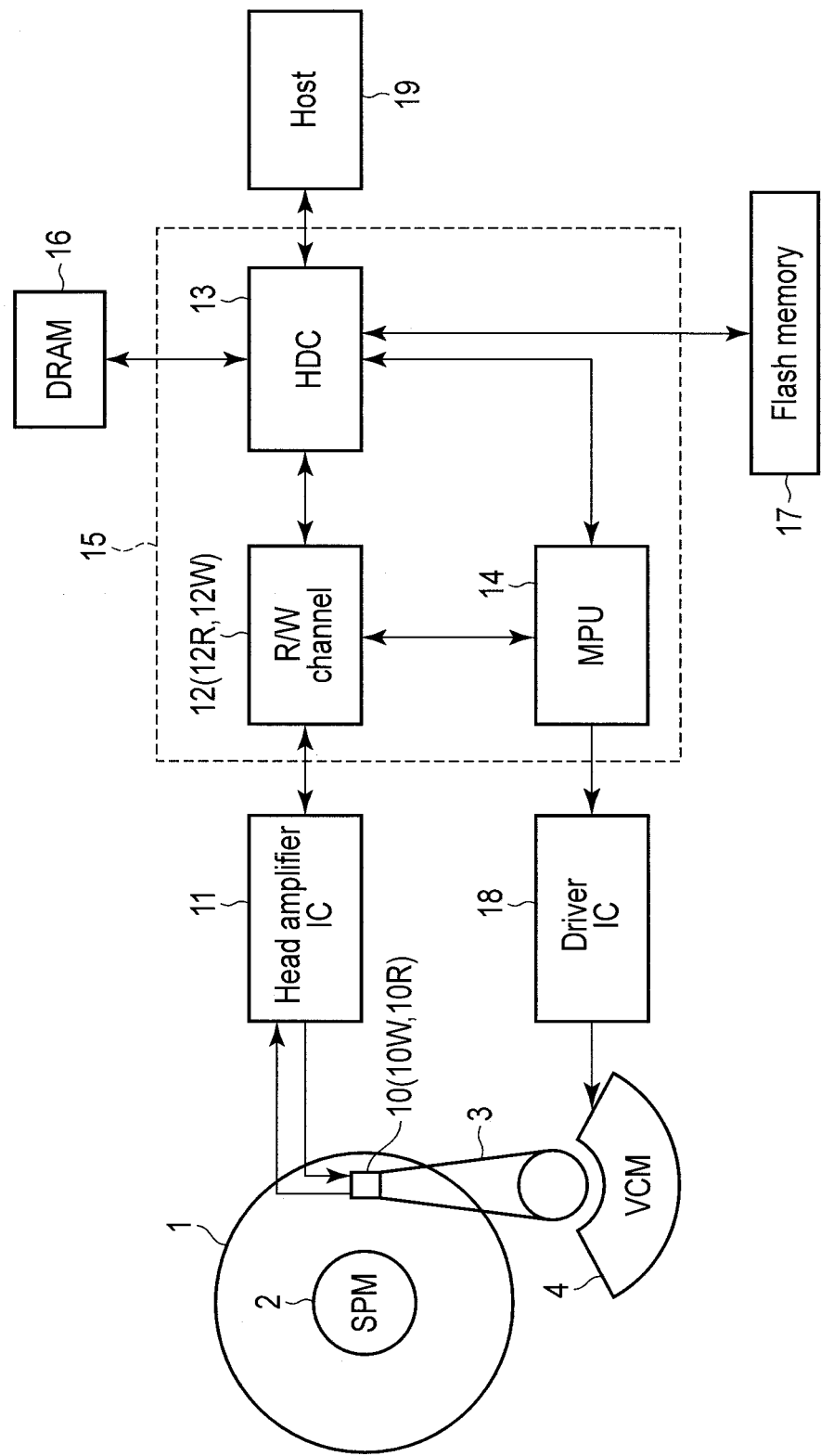
F I G. 1

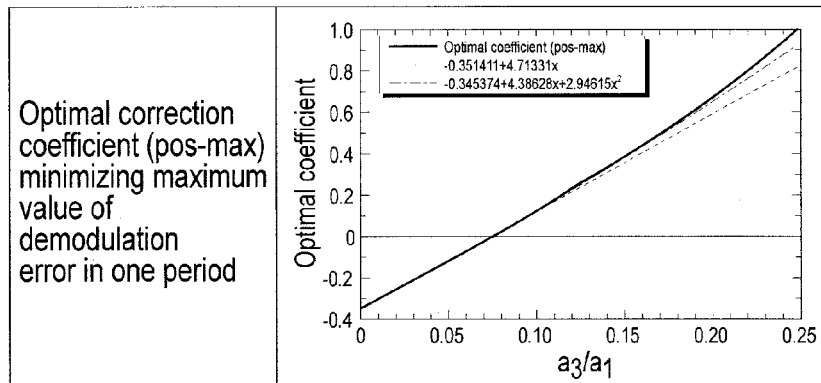

FIG. 6A — Optimal correction coefficient (pos-max) minimizing maximum value of demodulation error in one period

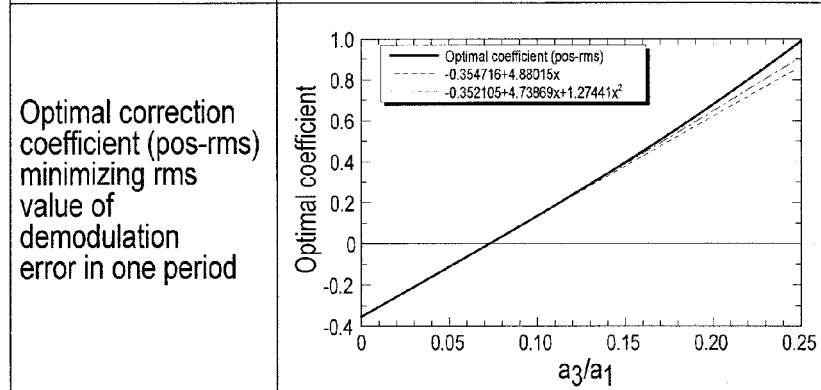

FIG. 6B — Optimal correction coefficient (pos-rms) minimizing rms value of demodulation error in one period

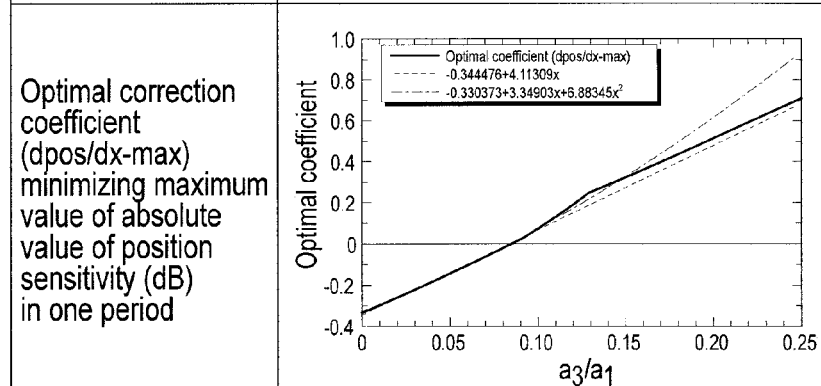

FIG. 6C — Optimal correction coefficient (dpos/dx-max) minimizing maximum value of absolute value of position sensitivity (dB) in one period

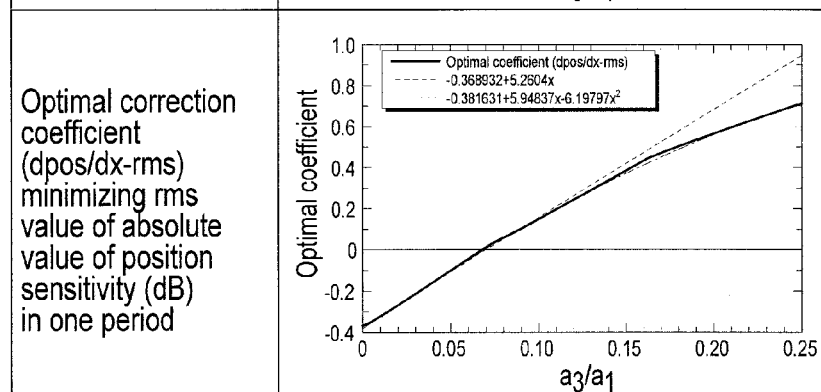

FIG. 6D — Optimal correction coefficient (dpos/dx-rms) minimizing rms value of absolute value of position sensitivity (dB) in one period

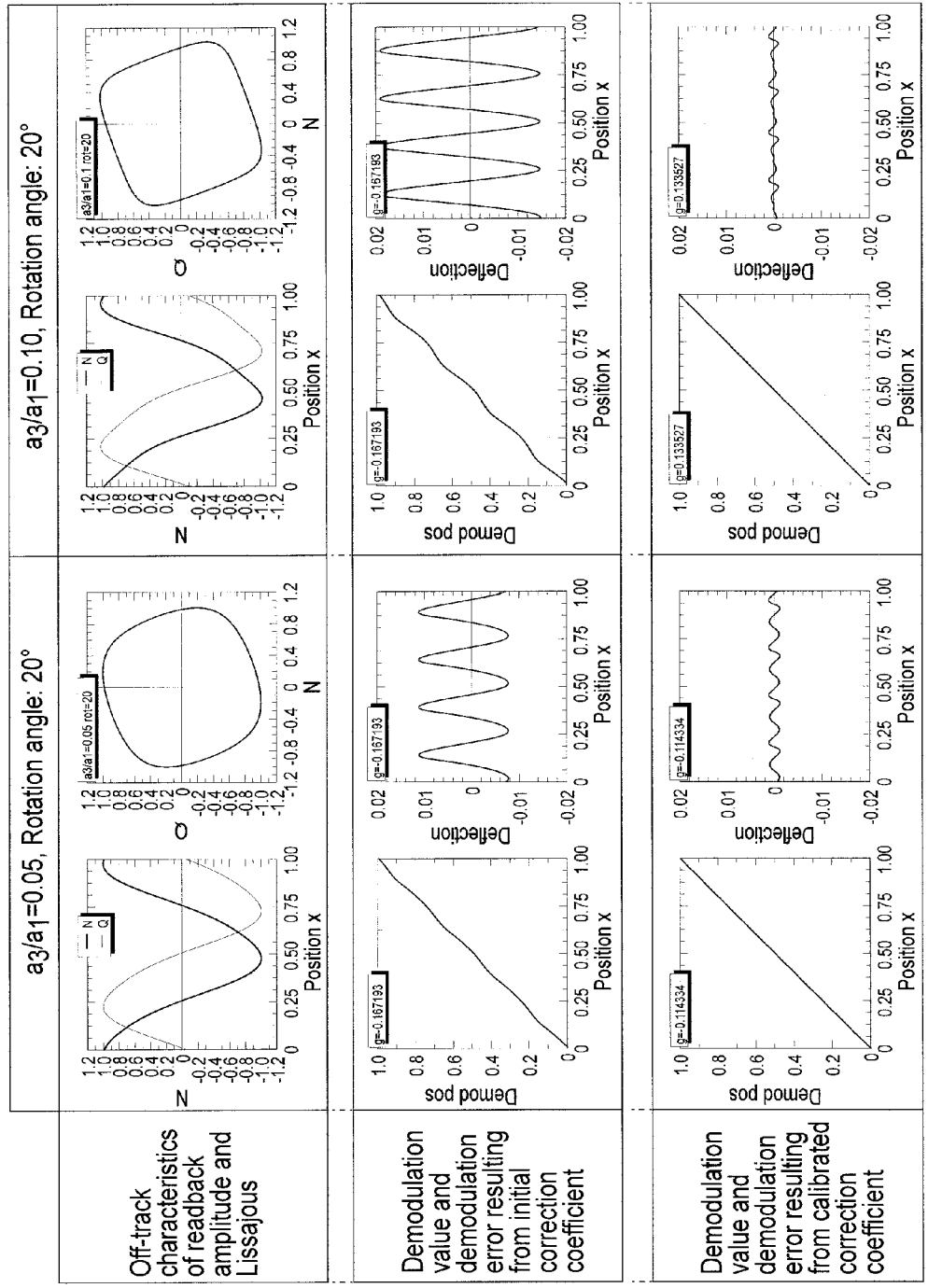
F I G. 8A — Off-track characteristics of readback amplitude and Lissajous
F I G. 8B — Demodulation value and demodulation error resulting from initial correction coefficient
F I G. 8C — Demodulation value and demodulation error resulting from calibrated correction coefficient

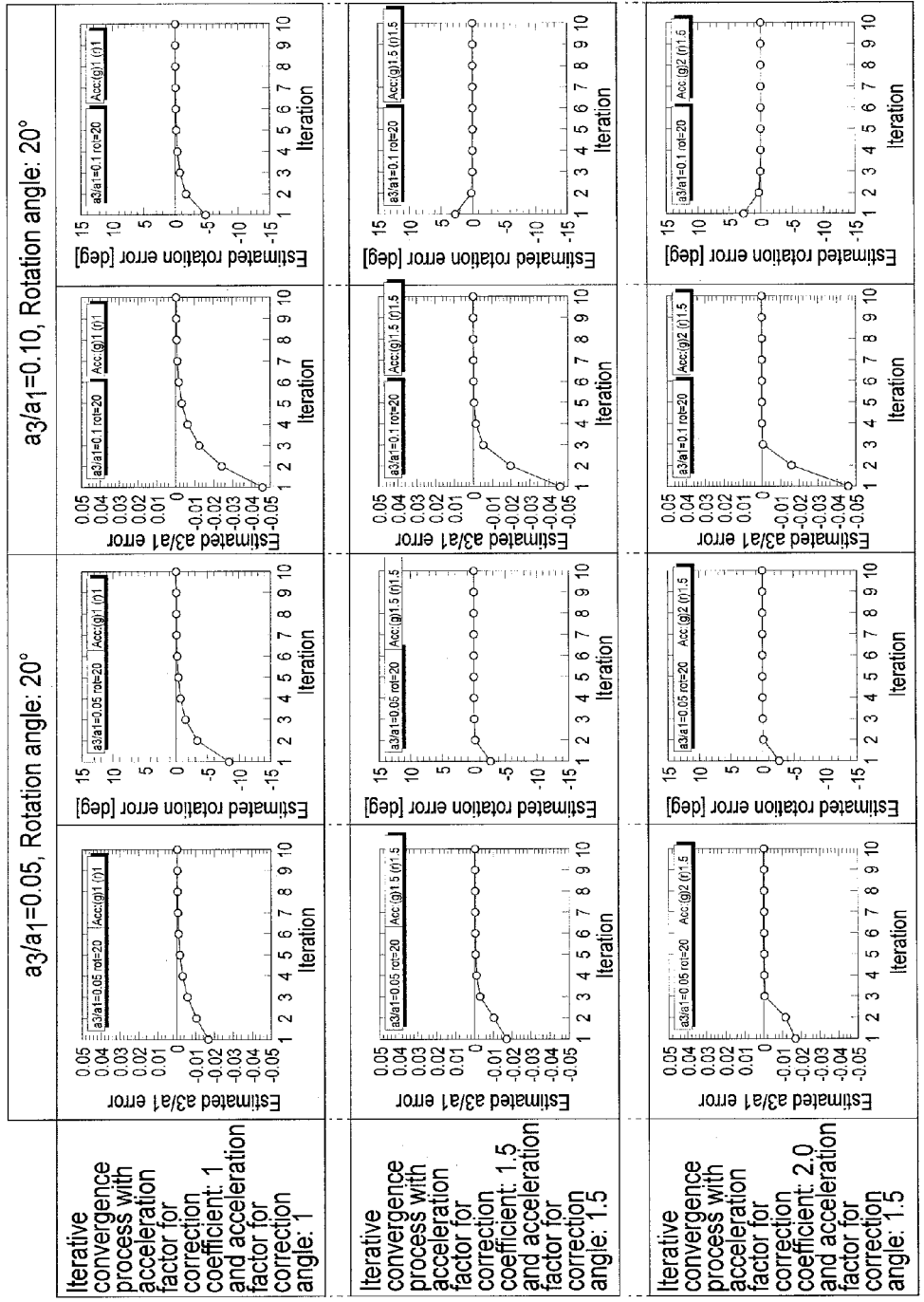

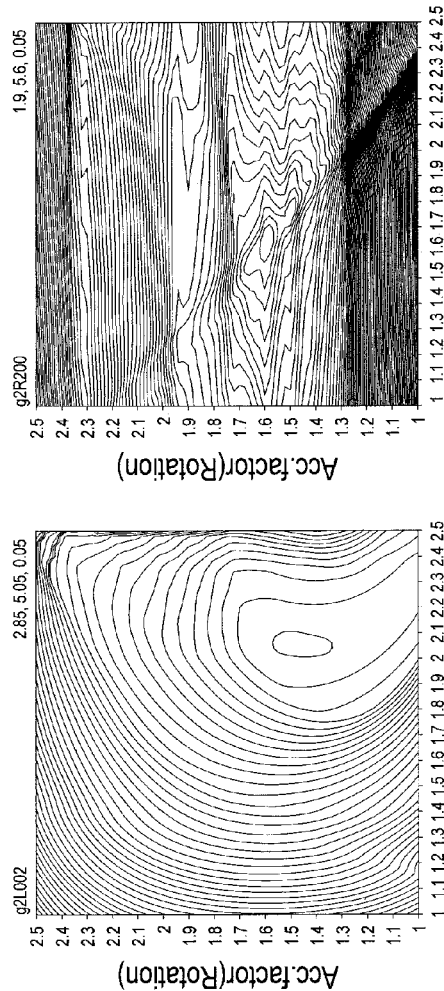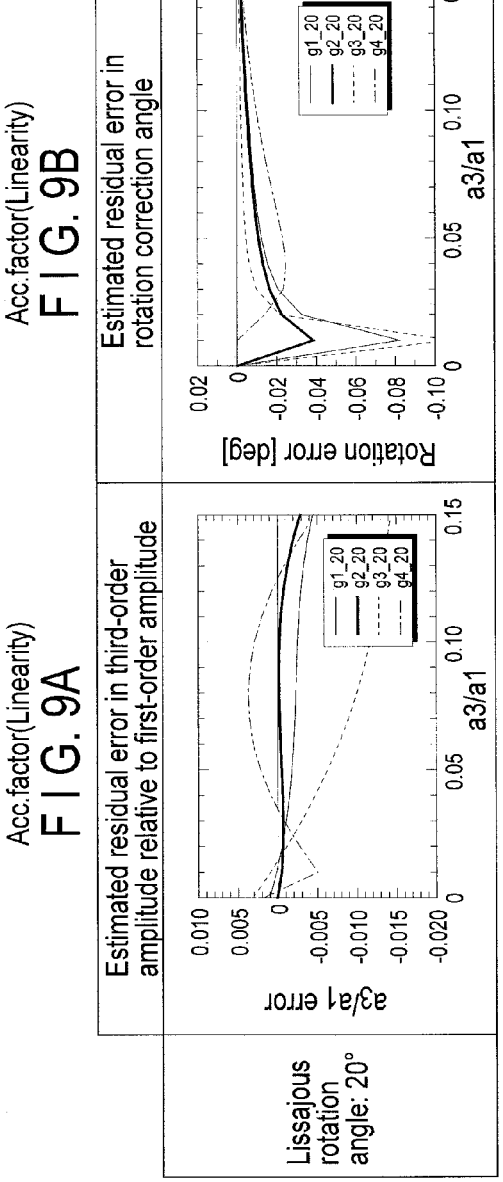

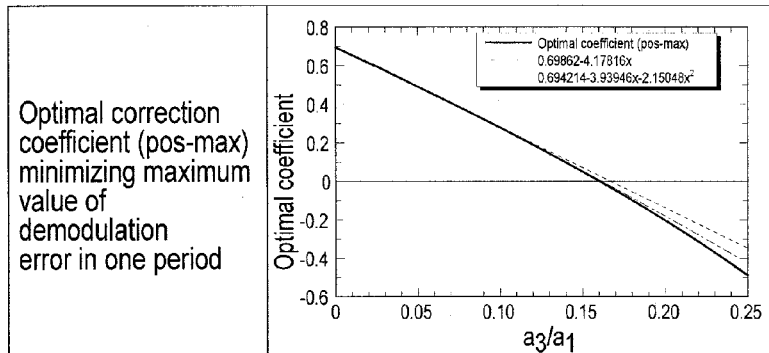

F I G. 11A  Optimal correction coefficient (pos-max) minimizing maximum value of demodulation error in one period

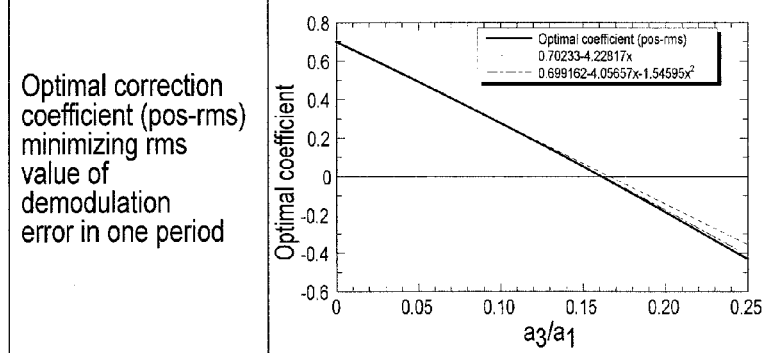

F I G. 11B  Optimal correction coefficient (pos-rms) minimizing rms value of demodulation error in one period

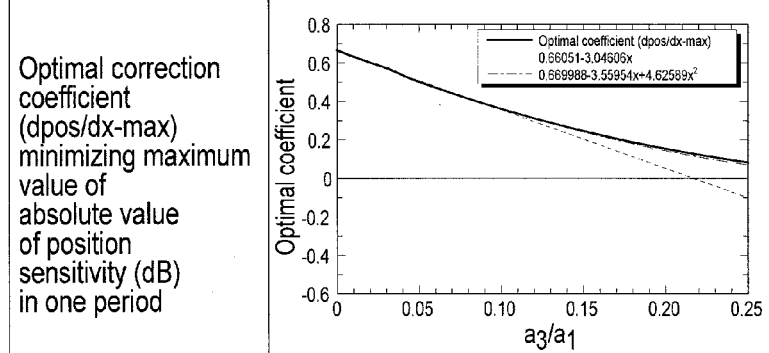

F I G. 11C  Optimal correction coefficient (dpos/dx-max) minimizing maximum value of absolute value of position sensitivity (dB) in one period

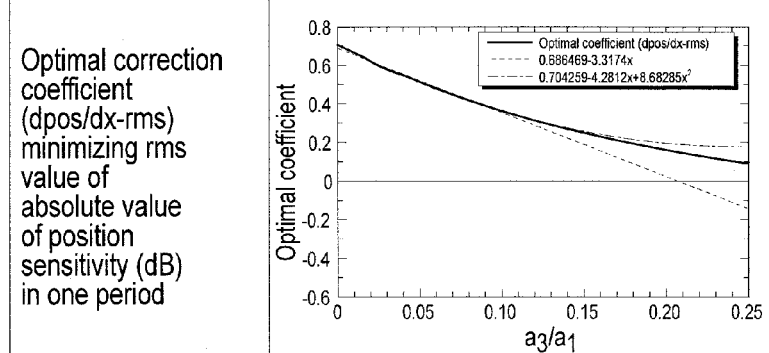

F I G. 11D  Optimal correction coefficient (dpos/dx-rms) minimizing rms value of absolute value of position sensitivity (dB) in one period

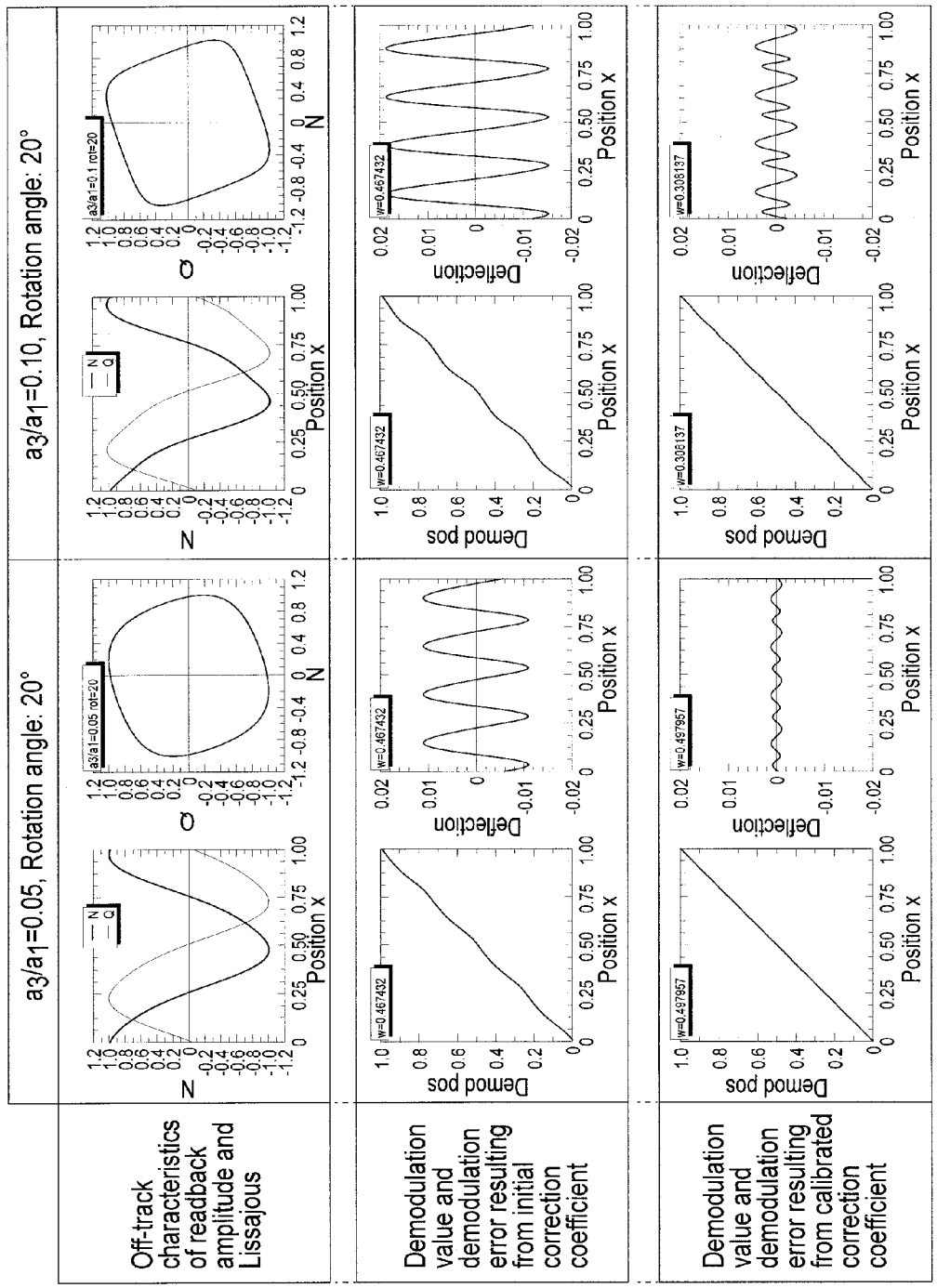
F I G. 12A
F I G. 12B
F I G. 12C

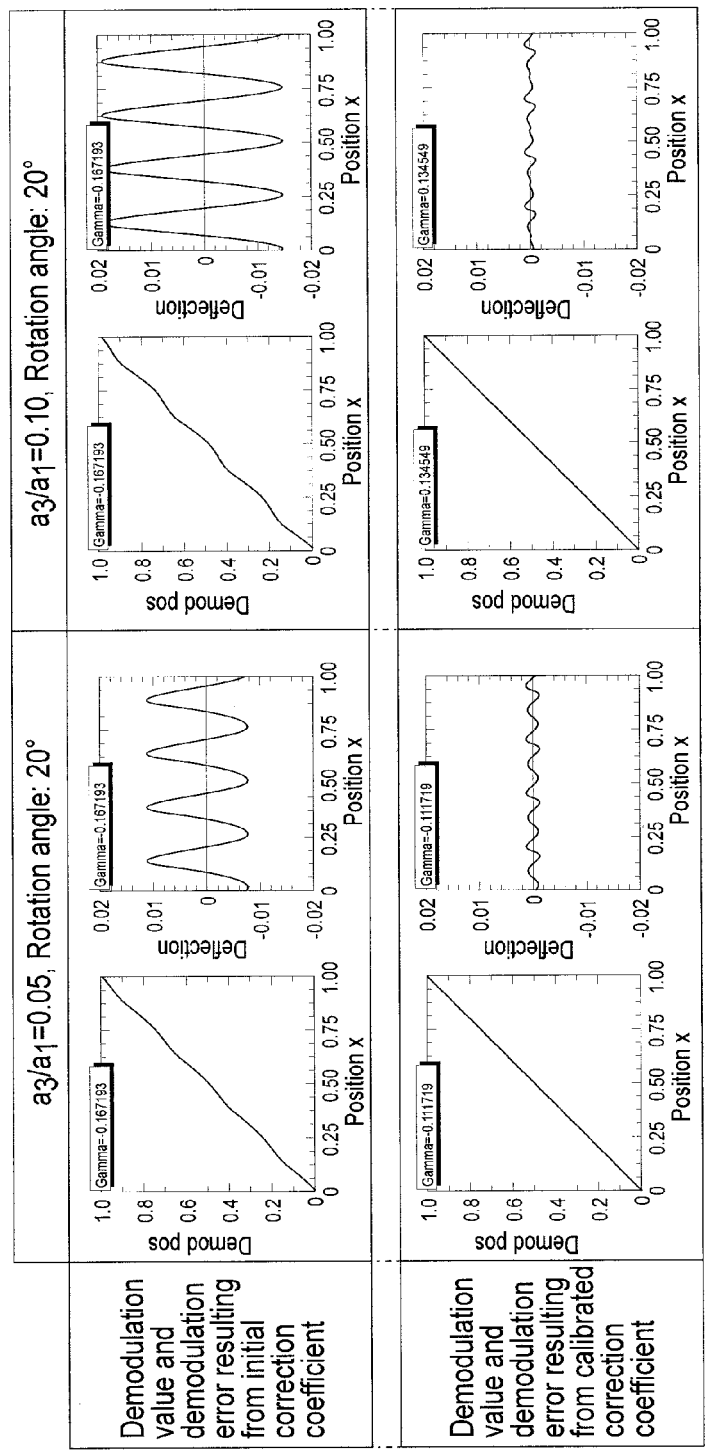
F I G. 16C
F I G. 16D

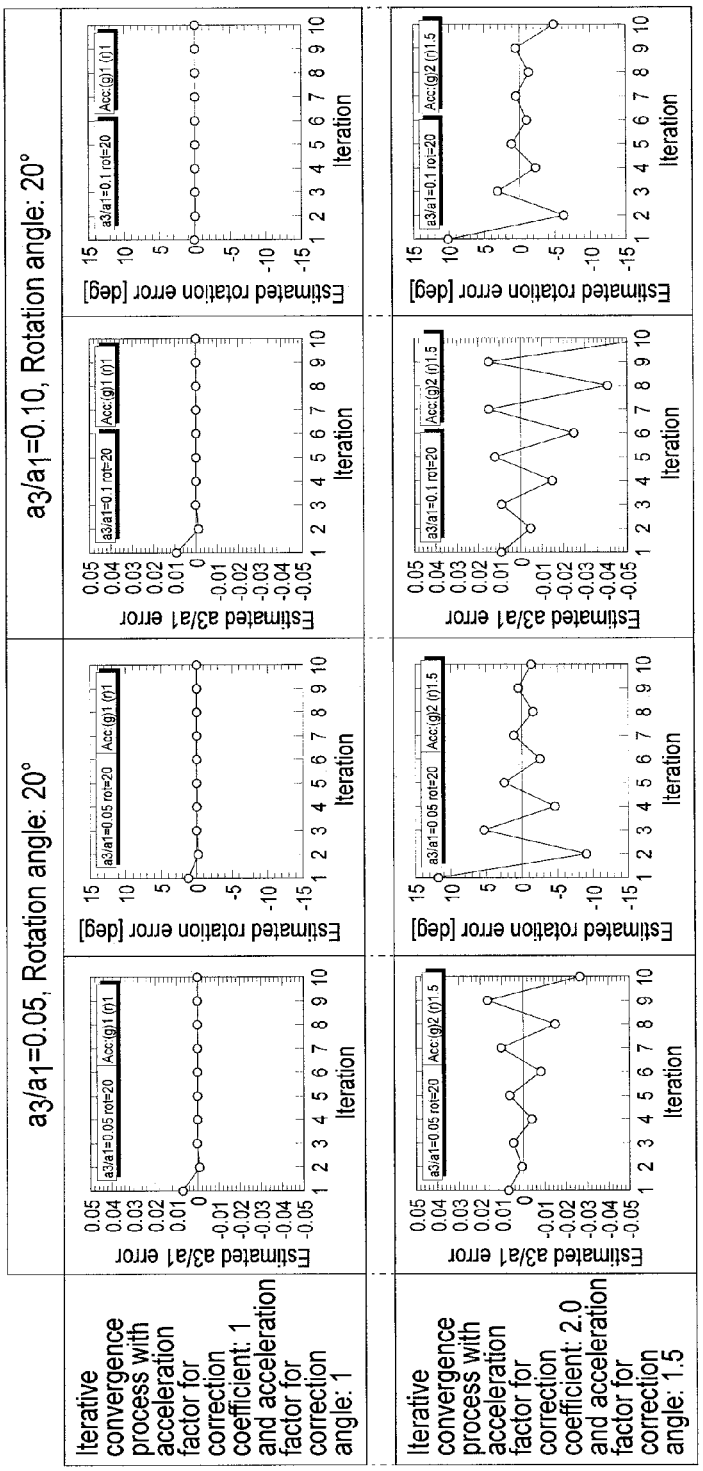
F I G. 16E
F I G. 16F

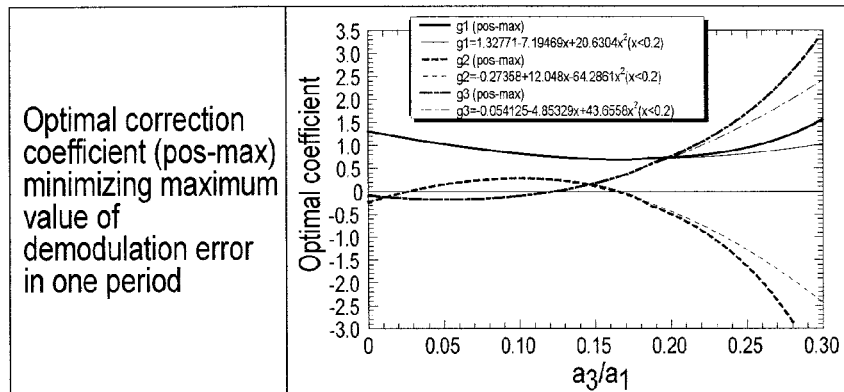

FIG. 18A Optimal correction coefficient (pos-max) minimizing maximum value of demodulation error in one period

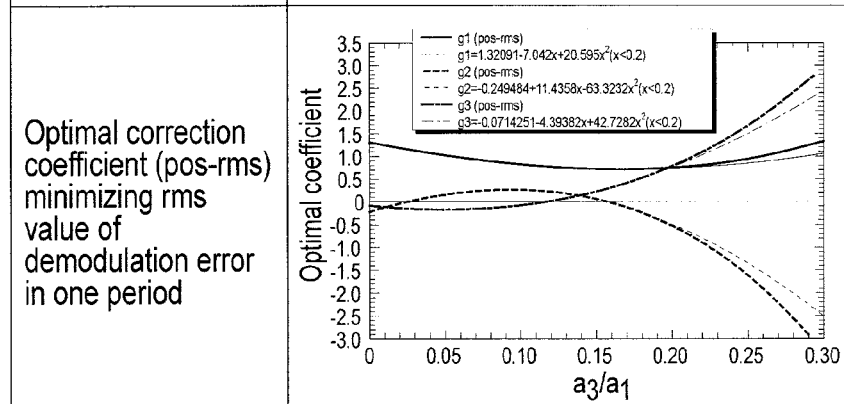

FIG. 18B Optimal correction coefficient (pos-rms) minimizing rms value of demodulation error in one period

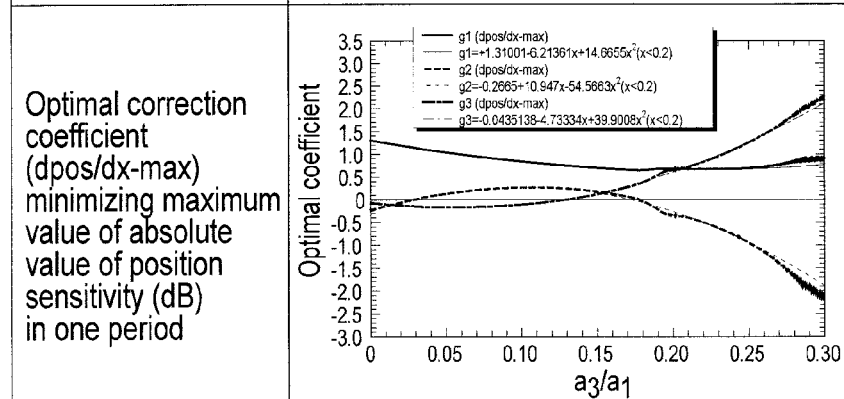

FIG. 18C Optimal correction coefficient (dpos/dx-max) minimizing maximum value of absolute value of position sensitivity (dB) in one period

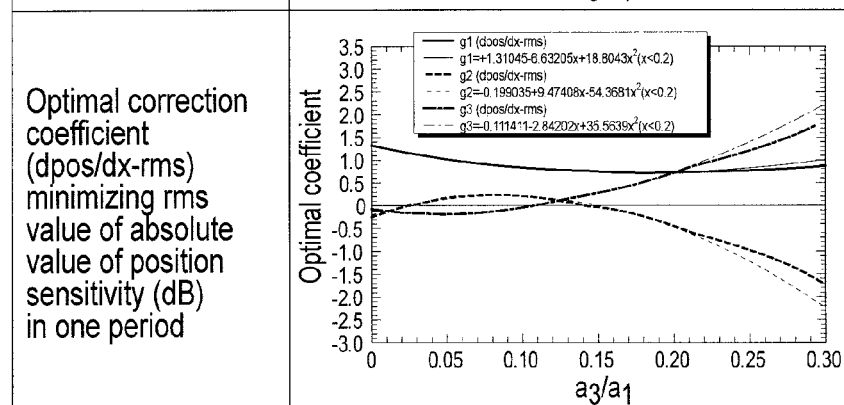

FIG. 18D Optimal correction coefficient (dpos/dx-rms) minimizing rms value of absolute value of position sensitivity (dB) in one period

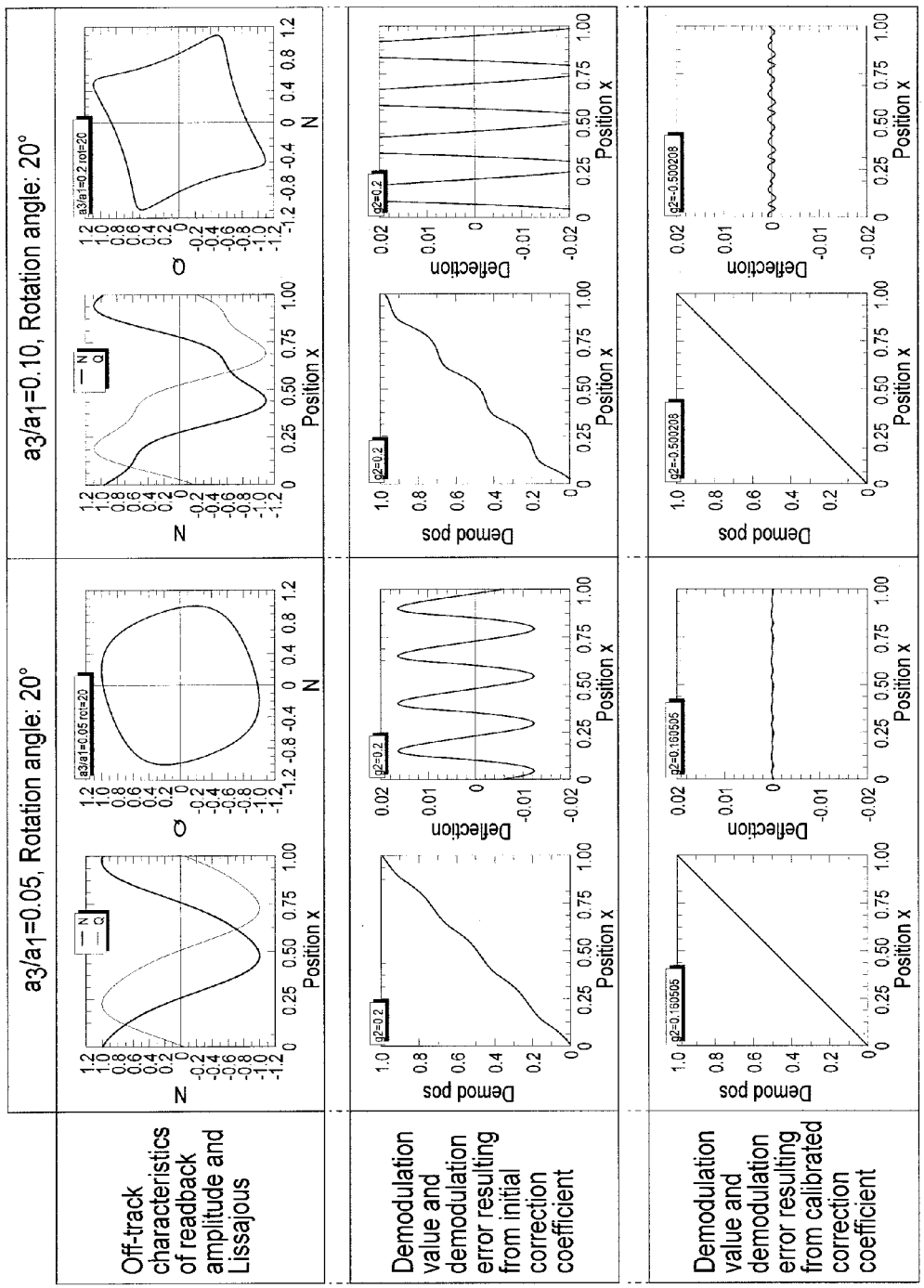
FIG. 19A Off-track characteristics of readback amplitude and Lissajous
FIG. 19B Demodulation value and demodulation error resulting from initial correction coefficient
FIG. 19C Demodulation value and demodulation error resulting from calibrated correction coefficient

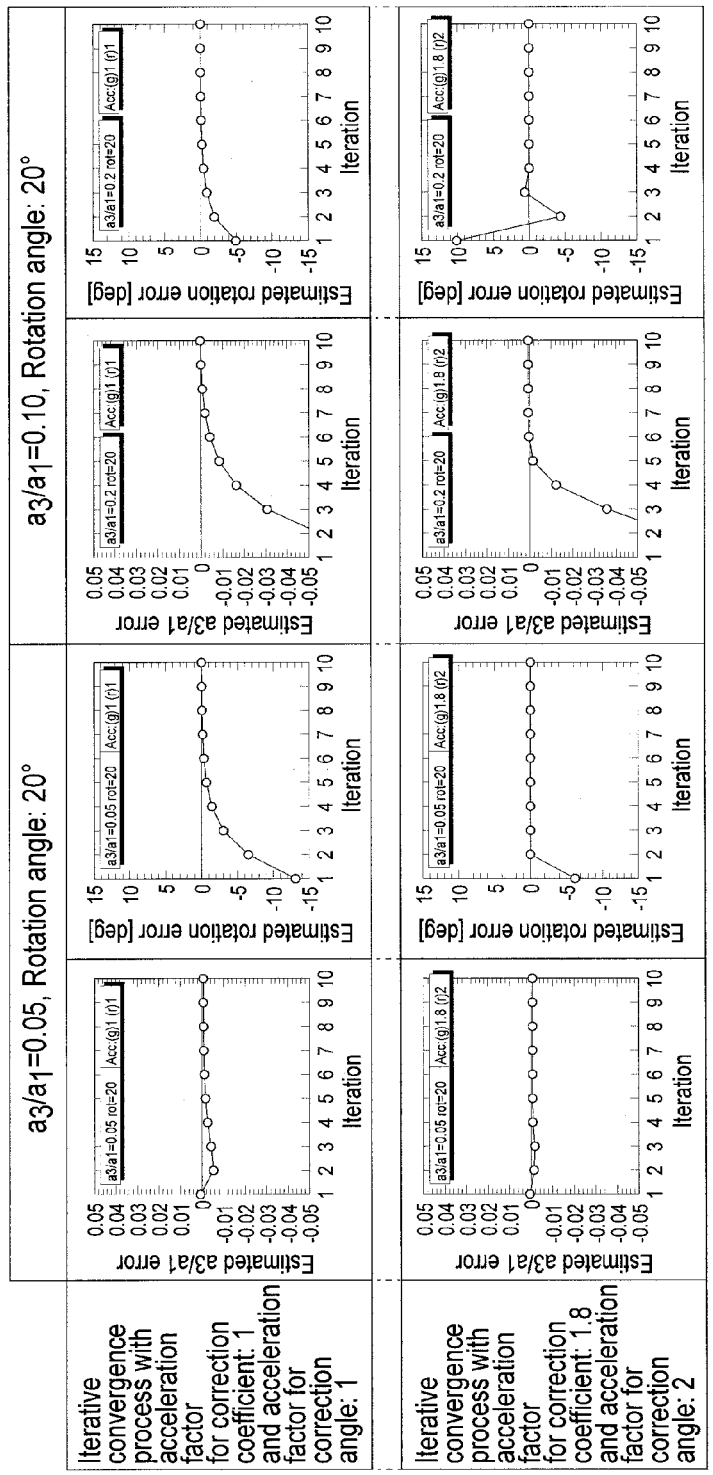
F I G. 19D
F I G. 19E

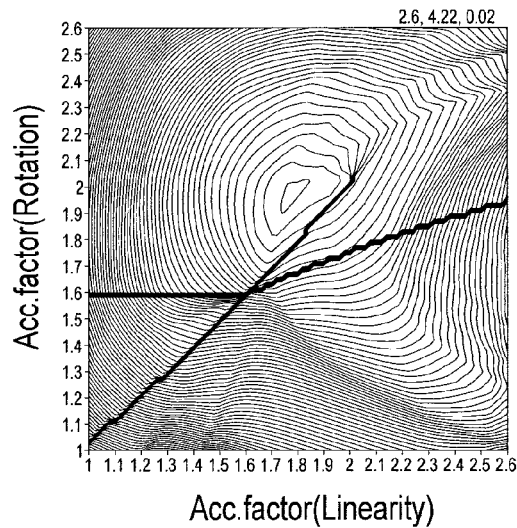
F I G. 20A
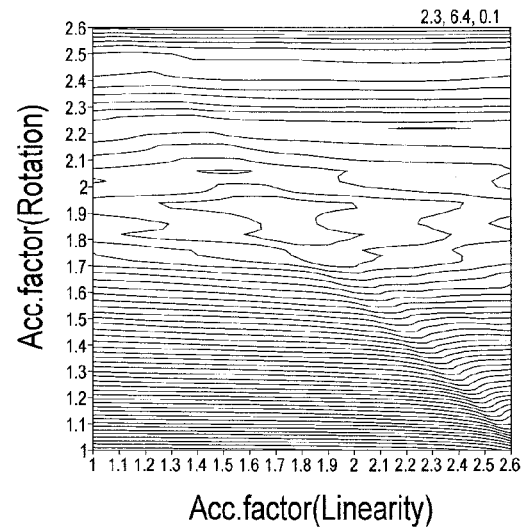
F I G. 20B
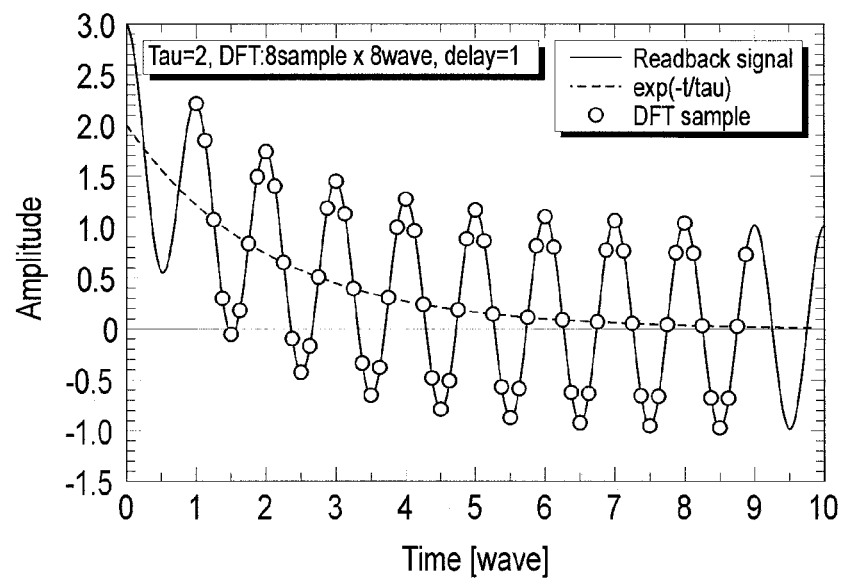
F I G. 21

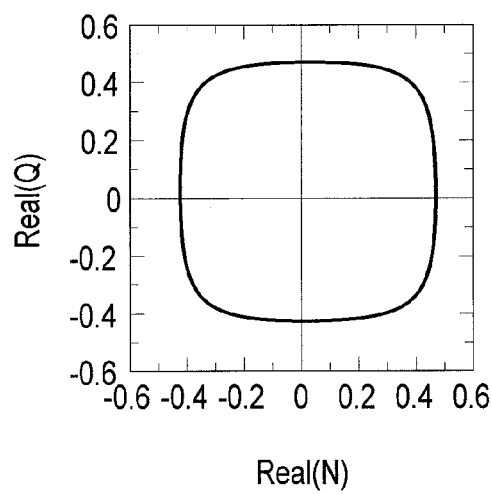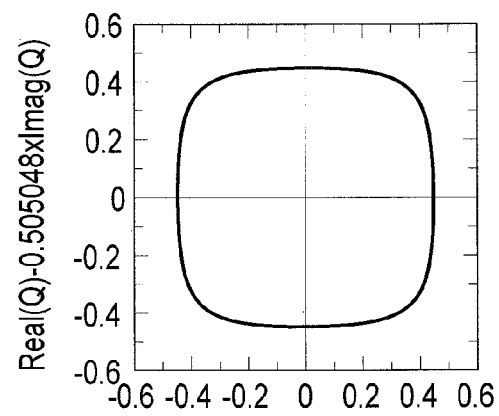
F I G. 22A  F I G. 22B

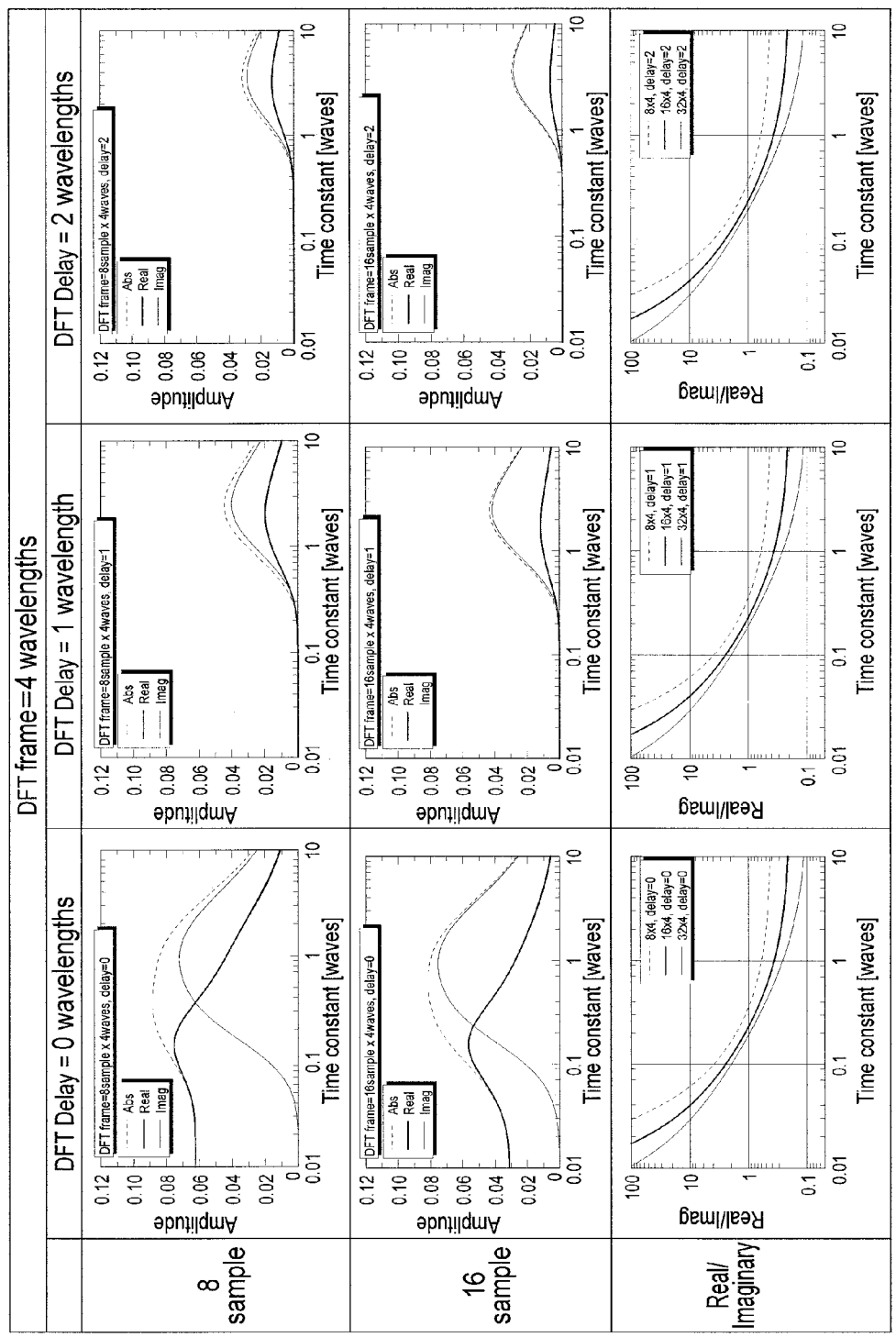
F I G. 23A
F I G. 23B
F I G. 23C

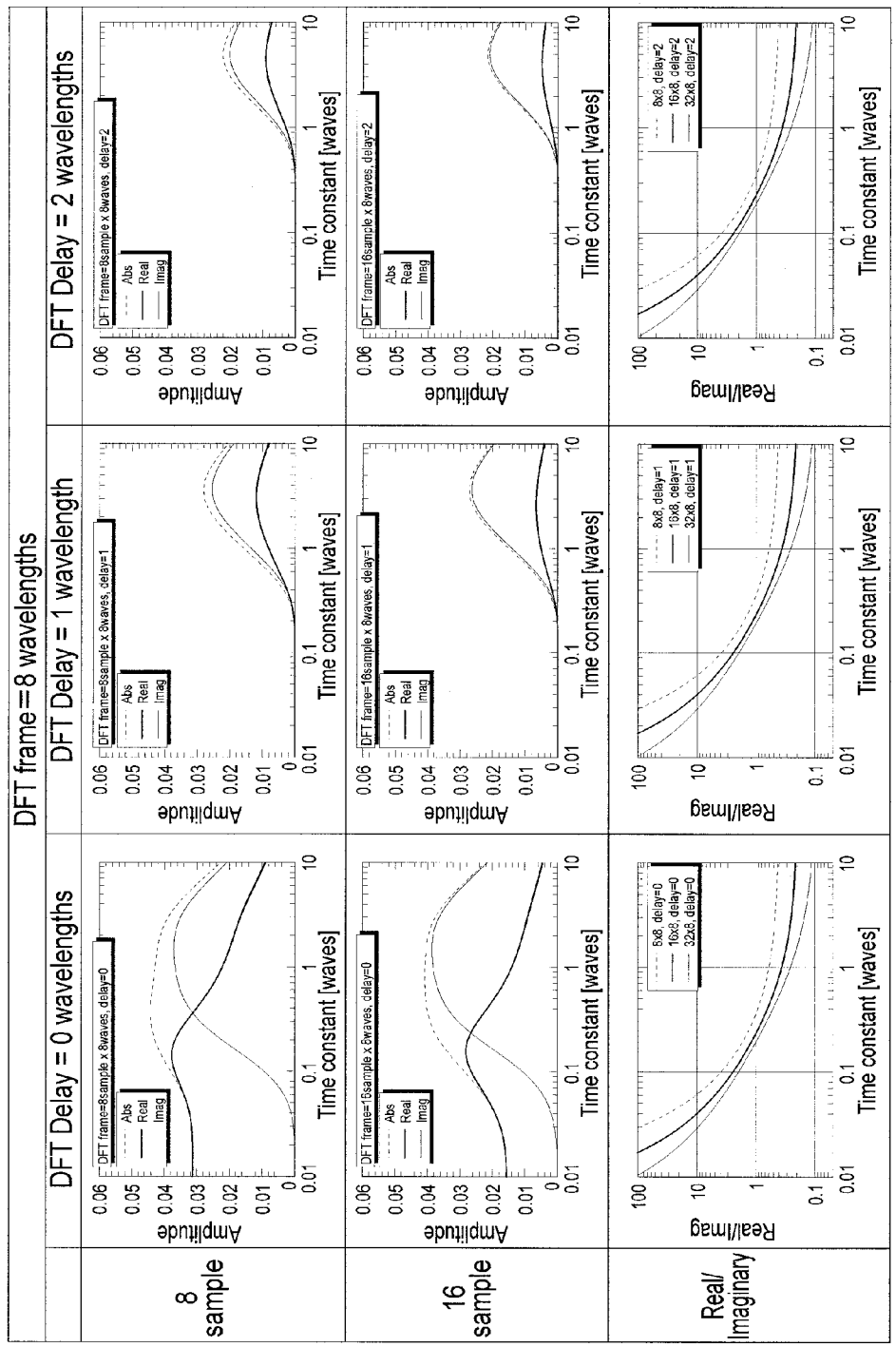
F I G. 24A
F I G. 24B
F I G. 24C

DISK STORAGE APPARATUS AND METHOD FOR SERVO DEMODULATION

CROSS-REFERENCE TO RELATED APPLICATIONS

This application claims the benefit of U.S. Provisional Application No. 61/822,565, filed May 13, 2013, the entire contents of which are incorporated herein by reference.

FIELD

Embodiments described herein relate generally to a disk storage apparatus and a method for servo demodulation.

BACKGROUND

A magnetic disk storage apparatus (hereinafter sometimes simply referred to as a disk drive) typified by a hard disk drive (HDD) comprises a servo system for positioning a head at a target position on a disk. The servo system demodulates a servo pattern (servo data) recorded in a servo area provided on the disk to demodulate (calculate) a position signal (position information) indicative of the position of the head on the disk.

The servo pattern is roughly classified into a null servo pattern and an area servo pattern. The null servo pattern comprises two burst fields with different magnetization patterns. Thus, a disk drive using the null servo pattern can have a reduced servo area compared to a disk drive using the area servo pattern, and advantageously ensures a larger data area.

The servo system carries out servo signal demodulation comprising demodulating a null servo pattern from a readback signal read by a reader (or a read head) and correcting the resultant demodulation signal to demodulate a position error signal (PES) indicative of the position of the head (reader). For the servo signal demodulation, a linearity correction that corrects an error between a demodulated position and an actual position is particularly important in demodulating a position error signal accurately indicative of the position of the reader. In the linearity correction, a calculation of an optimal correction coefficient for the correction functions is important.

Correction functions using correction coefficients have been proposed, and methods for determining the optimal correction coefficient for a correction function have been proposed. However, the conventional methods take much processing time to determine the optimal correction coefficient and may be susceptible to measurement errors when the amplitude of the null servo pattern is measured. This may make the linearity correction insufficient or excessive, hindering implementation of servo signal demodulation that demodulates an accurate position error signal.

BRIEF DESCRIPTION OF THE DRAWINGS

FIG. 1 is a block diagram illustrating a configuration of a disk drive according to a first embodiment;

FIGS. 6A, 6B, 6C and 6D are diagrams illustrating an optimal correction coefficient for an amplitude ratio according to the first embodiment;

FIGS. 8A, 8B, 8C, 8D, 8E and 8F are diagrams illustrating an example of a process for determining an optimal correction coefficient and an optimal rotation correction angle according to the first embodiment;

FIGS. 9A and 9B are diagrams illustrating examples of the number of convergences with respect to an acceleration factor according to the first embodiment;

FIGS. 10A and 10B are diagrams illustrating examples of estimated residual errors in the optimal correction coefficient and in the optimal rotation correction angle according to the first embodiment;

FIGS. 11A, 11B, 11C and 11D are diagrams illustrating an optimal correction coefficient for the amplitude ratio according to a second embodiment;

FIGS. 12A, 12B, 12C, 12D, 12E and 12F are diagrams illustrating an example of a process for determining an optimal correction coefficient and an optimal rotation correction angle according to the second embodiment;

FIGS. 16A, 16B, 16C, 16D, 16E and 16F are diagrams illustrating an example of a process for determining an optimal correction coefficient and an optimal rotation correction angle according to the third embodiment;

FIGS. 18A, 18B, 18C and 18D are diagrams illustrating an optimal correction coefficient for the amplitude ratio according to a fourth embodiment;

FIGS. 19A, 19B, 19C, 19D and 19E are diagrams illustrating an example of a process for determining an optimal correction coefficient and an optimal rotation correction angle according to the fourth embodiment;

FIGS. 20A and 20B are diagrams illustrating examples of the number of convergences with respect to an acceleration factor according to the fourth embodiment;

FIG. 21 is a diagram illustrating a waveform in which transient responses are superimposed on one another according to a fifth embodiment;

FIGS. 22A and 22B are diagrams illustrating a Lissajous figure observed before and after a correction according to the fifth embodiment;

FIGS. 23A, 23B and 23C are diagrams illustrating a correction coefficient according to the fifth embodiment; and FIGS. 24A, 24B and 24C are diagrams illustrating a correction coefficient according to the fifth embodiment.

DETAILED DESCRIPTION

Figure 2:
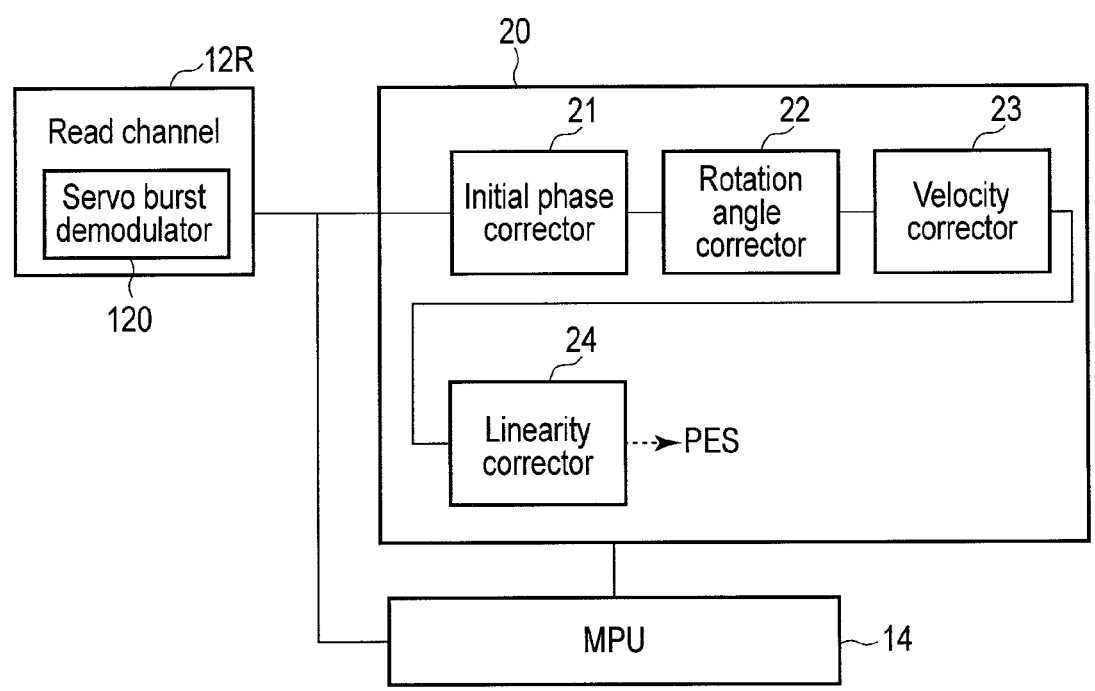
FIG. 2 is a block diagram illustrating a configuration of a servo system according to the first embodiment.

Various embodiments will be described below with reference to the drawings.

According to an embodiment, a disk storage apparatus includes a disk with a servo pattern recorded thereon and a processor. The processor generates a position error signal based on the servo pattern included in readback signals read by a reader. The processor offsets the reader in a cross-track direction on the disk and performs a discrete Fourier transform (DFT) operation on an amplitude data sequence of the readback signals with respect to the cross-track direction. The processor calculates an optimal correction coefficient for a linearity correction function used for a linearity correction of the position error signal based on a result of the DFT operation.

First Embodiment

FIG. 1 is a block diagram showing a main part of a disk drive according to the present embodiment.

As shown in FIG. 1, the disk drive generally comprises a head-disk assembly (HDA), a head amplifier integrated circuit (hereinafter referred to as a head amplifier IC) 11, a system controller 15, and a driver IC 18.

The HDA comprises a disk 1 that is a storage medium, spindle motor (SPM) 2, an arm 3 with a head 10 mounted thereon, and a voice coil motor (VCM) 4. The disk 1 is rotated by the spindle motor 2. The arm 3 and the VCM 4 form an actuator. The actuator is driven by the VCM 4 to move, in a controllable manner, the head 10 mounted on the arm 3 to a specified position on the disk 1. The VCM 4 is driven by a drive current from the driver IC 18 in a controllable manner.

The disk 1 comprises a large number of tracks formed therein. Each of the tracks comprises plurality of servo areas and data area each located between the servo areas. The head 10 comprises a reader (or a read head) 10R and a writer (or a write head) 10W. The reader 10R reads null servo patterns recorded in the disk 1. The reader 10R also reads data recorded in the data areas on the disk 1. The writer 10W writes data to the data areas on the disk 1.

The head amplifier IC 11 amplifies a readback signal read by the reader 10R and transmits the readback signal to a read/write (R/W) channel 12. The head amplifier IC 11 also transmits a write current corresponding to write data output by the R/W channel 12, to the writer 10W.

The system controller 15 comprises a single-chip integrated circuit and includes the R/W channel 12, hard disk controller (HDC) 13, a microprocessor (MPU) 14, and a user defined logic (UDL). The R/W channel 12 includes a read channel 12R and a write channel 12W.

The read channel 12R carries out a process of demodulating a readback signal (an output from the head amplifier IC 11) read by the reader 10R. The write channel 12W carries out signal processing on write data.

The HDC 13 includes an interface controller that controls data transfers between the host 19 and the R/W channel 12. The HDC 13 controls a buffer memory (DRAM) 16 and a flash memory 17 to read and write data.

An MPU 14 is a microcontroller and provides a servo system that controls the VCM 4 via the driver IC 18 to position the head 10 in a controllable manner (servo control). Moreover, the MPU 14 controls a data read operation or a data write operation performed on the disk 1 via the R/W channel 12.

[Configuration of the Servo System]

FIG. 2 shows a configuration of the servo system (in a narrow sense, the servo demodulation system) incorporated in the disk drive according to the present embodiment. As shown in FIG. 2, the servo system comprises a servo burst demodulator 120, a position demodulator 20, and the MPU 14.

The servo burst demodulator 120 demodulates a null servo pattern from a readback signal (an output from the head amplifier IC 11) read by the reader 10R. The servo burst demodulator 120 performs a discrete Fourier transform (DFT) operation on a data sequence in a readback signal for a time domain, and outputs a demodulation signal as a result of the DFT operation. However, a real-valued DFT in general refers to an operation of converting n time series data into (n/2-1) complex data, that is, first- to (n/2-1)th-order complex data, and zeroth- and n/2th-order real data, that is, a total of n real data, but the servo burst demodulator 120 according to the present embodiment performs an arithmetic operation of determining only one complex data with a particular order (two real-valued data) (an output form involves, for example, a sine component and a cosine component).

The position demodulator 20 is, for example, a module incorporated in the above-described UDL as hardware. All or a part of the position demodulator 20 may be implemented by firmware as a function of the MPU 14. The position demodulator 20 includes an initial phase corrector 21, a rotation angle corrector 22, a velocity corrector 23, and a linearity corrector 24. The initial phase corrector 21 carries out a correction such that a demodulation signal resulting from a DFT operation in the servo burst demodulator 120 is rotated and placed parallel to a real axis or an imaginary axis on a complex plane. The rotation angle corrector 22 carries out such a rotation angle correction as described below on the demodulation signal corrected by the initial phase corrector 21. The velocity corrector 23 carries out a velocity correction on the demodulation signal corrected by the rotation angle corrector 22. Specifically, the velocity corrector 23 corrects an N vs Q Lissajous elliptic shape to a circular shape. The linearity corrector 24 corrects the linearity of a change in the demodulation signal after the correction by the velocity corrector 23 with respect to an actual change in the position of the reader 10R, and outputs a position error signal (PES).

The MPU 14 performs an arithmetic operation of calculating the optimal correction coefficient for a linearity correction function in the linearity corrector 24.

[Servo Demodulation Operation]

A servo demodulation operation according to the present embodiment will be described below with reference to FIGS. 3 to 10B.

Figure 3:
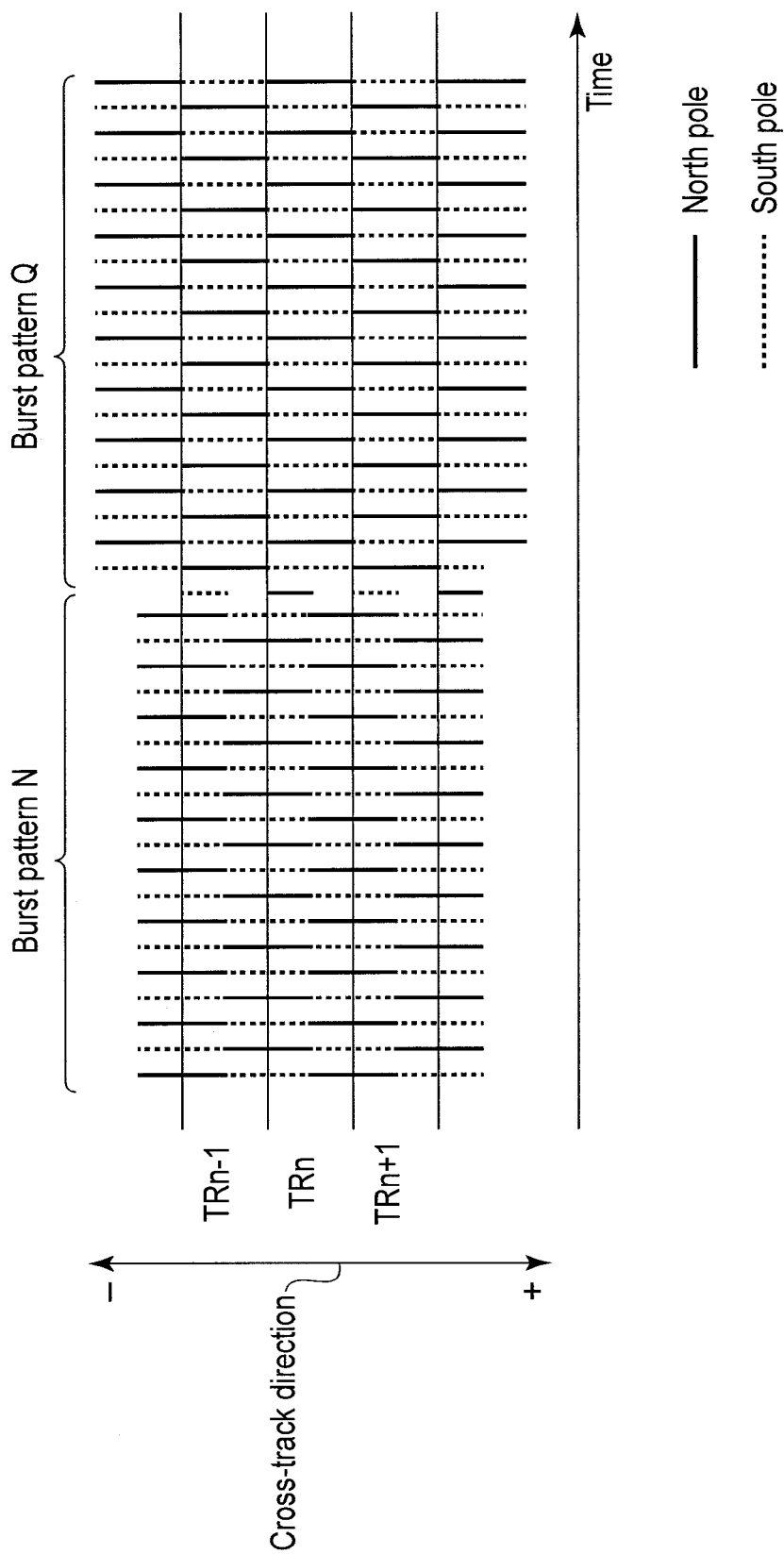
FIG. 3 is a diagram illustrating an example of a null servo pattern according to the first embodiment.

FIG. 3 is a diagram showing an example of a null servo pattern according to the present embodiment. The present embodiment will be described on the assumption that the null servo pattern comprises two null burst patterns N and Q. The present embodiment can also be applied to an area servo pattern comprising four burst patterns A to D by conversions N=A−B and Q=C−D.

In such a null servo pattern as shown in FIG. 3, the functions of medium magnetization distributions in the cross-track direction (x-direction) on the disk 1 in the N and Q are denoted by n(x) and q(x), respectively. The function of a sensitivity distribution for the reader 10R is denoted by h(x). In this case, readback signal amplitudes N(x) and Q(x) at the position x of the reader 10R are expressed by:

$$N(x)=\int h(t-x)n(t)dt \quad (1)$$

$$Q(x)=\int h(t-x)q(t)dt \quad (2)$$

where n(x) and q(x) denote periodic functions with a period X and thus have characteristics indicated by:

$$n(x)=n(x+X) \quad (3)$$

$$q(x)=q(x+X) \quad (4)$$

Moreover, the sign of the expression is reversed at every ½ period, and thus, n(x) and q(x) have characteristics indicated by:

$$n(x)=-n(x+X/2) \quad (5)$$

$$q(x)=-q(x+X/2) \quad (6)$$

Furthermore, the phase of q(x) is offset from the phase of n(x) by X/4, and q(x) is thus characterized by q(x)=n(x−X/4). Hence, n(x) and q(x) can be expressed by:

$$n(x) = \sum a_i \cdot \cos(2\pi i \cdot (x - x_{mi})/X) \quad (7)$$
$$q(x) = \sum a_i \cdot \cos(2\pi i \cdot (x - x_{mi} - X/4)/X)$$

$$= \Sigma a_i \cos(2\pi i \cdot (x-x_{mi})/X - \pi i/2) \quad (8)$$

In equations (7) and (8), i=1, 3, 5, 7, 9, . . . . Furthermore, the characteristic n(x)=−n(x+X/2) makes all orders odd. The phase of each order is $2\pi i \cdot x_{mi}/X$.

Moreover, N(x) and Q(x) are convolution integrals and can thus be expressed by equations (9) and (10) shown below if n(x), g(x), and h(−x) subjected to Fourier transform are represented as F(n(x)), F(q(x)), and F(h(−x)).

$$N(x)=invF(F(n(x))\cdot F(h(-x))) \quad (9)$$

$$Q(x)=invF(F(q(x))\cdot F(h(-x))) \quad (10)$$

That is, N(x) or Q(x) can be determined by carrying out inverse Fourier transform (invF) on the product of F(h(x)) and F(h(−x)) or the product of F(q(x)) and F(h(−x)).

The medium magnetization patterns n(x) and q(x) are periodic functions with the above-described characteristics, and thus, F(n(x)) and F(q(x)) has only an integral odd-numbered order component of 1/X appearing at a magnetization pattern period X. On the other hand, F(h(−x)) is a continuous function, and the product of F(h(−x)) and F(n(x)) is only an integral odd-numbered order component. In general, h(x) is bell-shaped, and thus, F(h(−x)) has approximately no high-order component. In many cases, F(n(x))·F(h(−x)) are approximately negligible except for first- and third-order components. Thus, N(x) and Q(x) can be expressed by:

$$N(x) = a_{m1} \cdot a_{h1} \cdot \cos(2\pi \cdot (x - (x_{m1} + x_{h1}))/X) + \quad (11)$$
$$a_{m3} \cdot a_{h3} \cdot \cos(2\pi \cdot 3 \cdot (x - (x_{m3} + x_{h3}))/x)$$

$$Q(x) = a_{m1} \cdot a_{h1} \cdot \sin(2\pi \cdot (x - (x_{m1} + x_{h1}))/X) - \quad (12)$$
$$a_{m3} \cdot a_{h3} \cdot \sin(2\pi \cdot 3 \cdot (x - (x_{m3} + x_{h3}))/x)$$

Moreover, a transition in which a first-order phase is 0 at X=0 allows N(x) and Q(x) to be expressed by equations (13) and (14) if a third-order transitional amount is represented as $x_3 = x_{m3} + x_{h3} − x_{m1} − x_{h1}$, if the amplitude is represented as $a_1 = a_{m1} \cdot a_{h1}$ and $a_3 = a_{m3} \cdot a_{h3}$.

$$N(x)=a_1 \cos(2\pi x/X)+a_3 \cos(2\pi \cdot 3(x-x_3)/X) \quad (13)$$

$$Q(x)=a_1 \sin(2\pi x/X)-a_3 \sin(2\pi \cdot 3(x-x_3)/X) \quad (14)$$

As described above, the reaback signal amplitudes N(x) and Q(x) at the position x of the reader 10R can be characterized by the amplitudes and phases of the first- and third-order components.

Now, on the assumption that $\phi=2\pi \cdot x/X$, rotating an N vs Q Lissajous figure of $x_3$=0 by angle θ allows N(x) and Q(x) to be expressed by:

$$N(x)=\cos\theta(a_1\cos\phi+a_3\cos 3\phi)-\sin\theta(a_1\sin\phi-a_3\sin 3\phi)=a_1\cos(\phi+\theta)+a_3\cos(3\phi-\theta) \quad (15)$$

$$Q(x)=\sin\theta(a_1\cos\phi+a_3\cos 3\phi)+\cos\theta(a_1\sin\phi-a_3\sin 3\phi)=a_1\sin(\phi+\theta)-a_3\sin(3\phi-\theta) \quad (16)$$

Rewriting φ+θ to φallows N(x) and Q(x) to be expressed by:

$$N(x)=a_1\cos\phi+a_3\cos(3\phi-4\theta) \quad (17)$$

$$Q(x)=a_1\sin\phi-a_3\sin(3\phi-4\theta) \quad (18)$$

Hence, the rotation angle θ of the Lissajous figure can be expressed by:

$$\theta=1.5\pi\times 3/X=1.5\pi(x_{m3}+x_{h3}-x_{m1}-x_{h1})/X \quad (19)$$

Using $\psi_{mi}=2\pi i \cdot x_{mi}/X$ and $\psi_{hi}=2\pi i \cdot x_{hi}/X$ allows the rotation angle θ to be expressed by:

$$\theta=0.25(\psi_{m3}+\psi_{h3})-0.75(\psi_{m1}+\psi_{h1}) \quad (20)$$

Thus, the rotation angle θ of the Lissajous figure is calculated to be ¼ of the relative phase $\psi_3-3\psi_1$ of the third-order component relative to the first-order component for N(x) or Q(x). That is, if the position of the reader 10R is offset at regular intervals in the cross-track direction (x), the readback amplitude N(x) is measured and a DFT operation is performed on the magnetization pattern period X. Thus, when the first- and third-order phases $\psi_1$ and $\psi_3$ with respect to the space frequency 1/X are determined, the rotation angle θ can be determined to be $0.25\psi_3-0.75\psi_1$.

A Fourier series expansion of a rectangular magnetization pattern is 4/π*(cos(x)−cos(3x)/3+cos(5x)/5−cos(7x)/7+ . . . ), and the third order is in a phase reverse to the phase of the first order.

Similarly, the relative phase $\psi_{m3}-3\psi_{m1}$ of the third-order component relative to the first-order component for a general magnetization distribution F(n(x)) is approximately n (reverse phase). Thus, $a_1$ and $a_3$ in Equations (17) and (18) described above have reverse signs and can be expressed by equations (21) and (22), which are easier to understand.

$$N(x)=a_1\cos\phi-a_3\cos(3\phi-4\theta) \quad (21)$$

$$Q(x)=a_1\sin\phi+a_3\sin(3\phi-4\theta) \quad (22)$$

In equations (21) and (22), $a_1$>0 and $a_3$>0.

The rotation angle θ is rotated by π/4 as follows.

$$\theta=0.25\psi_3-0.75\psi_1\pm\pi/4$$

Figures 4A, 4B:
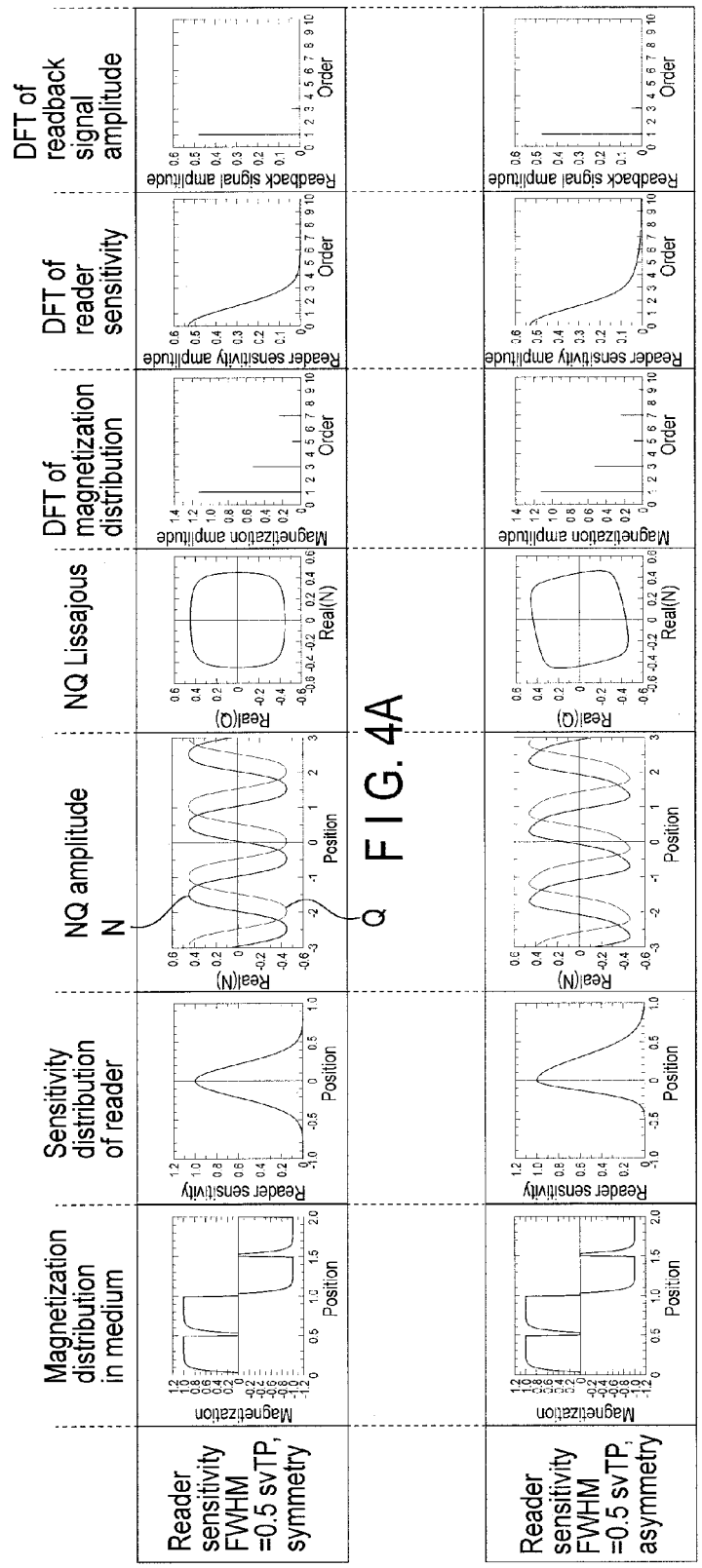
FIGS. 4A and 4B are diagrams illustrating examples of a simulation for the first embodiment.

FIGS. 4A and 4B show an example of a simulation of a process expressed by equations (1) to (23), described above, and related to the null servo pattern shown in FIG. 3 and several head sensitivity distribution characteristics. In this case, svTP denotes a servo track (TRn shown in FIG. 3), and one magnetization period corresponds to two servo tracks. The magnetization pattern period is a unit in the cross-track direction (x). IN FIGS. 4A and 4B, the FWHM means "full width at half maximum".

Figure 5A:
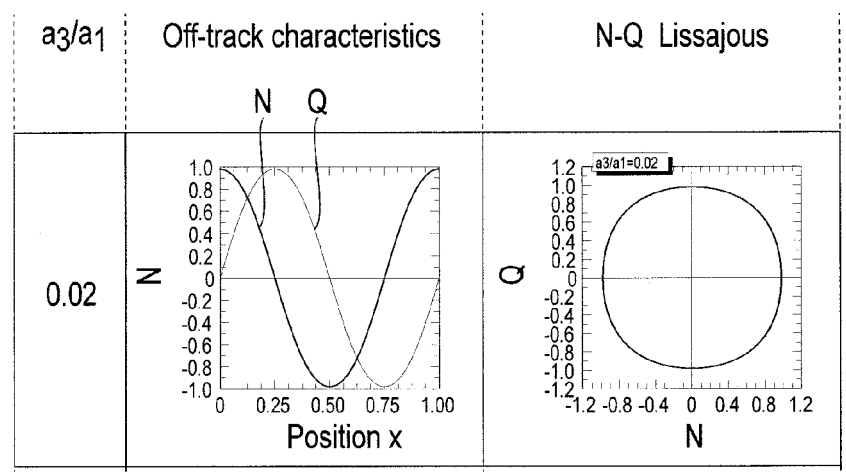
FIGS. 5A and 5B are diagrams illustrating examples of Lissajous characteristics according to the first embodiment.
Figure 5B:
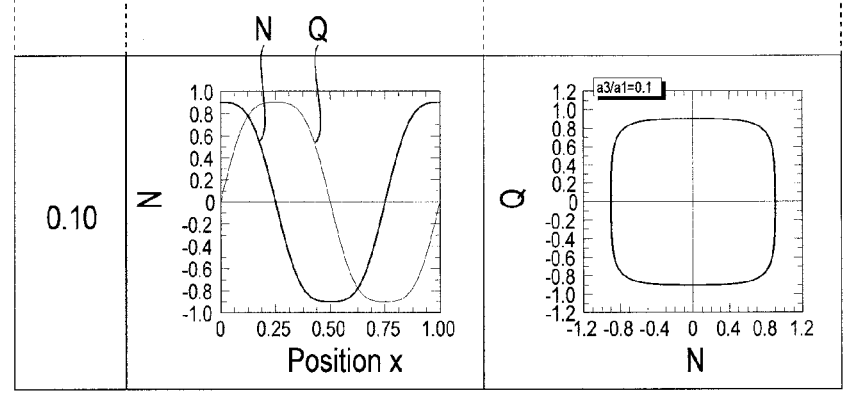

As shown in FIG. 4B, if the head sensitivity distribution is asymmetric, the third-order relative phase appears to increase the Lissajous rotation angle. As shown in the left figures in FIG. 4B, the medium magnetization distribution is basically asymmetric, but a relatively small third-order relative phase makes a Lissajous rotation angle resulting from the asymmetry of the medium magnetization distribution smaller than a Lissajous rotation angle resulting from the asymmetry of the head sensitivity distribution. On the other hand, as shown in FIGS. 5A and 5B, a reduced half width of the head sensitivity distribution makes the Lissajous figure tend to be nearly square. The tendency can be approximately expressed by the amplitude ratio ($a_3/a_1$) of the third-order component to the first-order component.

As described above, the rotation angle corrector 22 in the position demodulator 20 carries out a rotation correction by reversely rotating the demodulation signal corrected by the initial phase corrector 21, by the angle θ.

Then, a method for determining the correction coefficient of the linearity correction function will be described. According to the present embodiment, the linearity corrector 24 corrects the linearity of a position change determining the position of the reader 10R based on a change in demodulation signal after a correction by the velocity corrector 23 and outputs a position error signal (PES) as described above. The MPU 14 performs an arithmetic operation of calculating the optimal correction coefficient of the linearity correction function for the linearity corrector 24 based on the result of a DFT operation by the servo burst demodulator 120.

FIGS. 6A, 6B, 6C and 6D show examples of the optimal correction coefficient for the amplitude ratio $a_3/a_1$. The amplitude ratio $a_3/a_1$ means the ratio of the third-order component amplitude $a_3$ to the first-order component amplitude $a_1$. The present embodiment applies a method for calculating the optimal correction coefficient to the linearity correction function $(1-G_m) \cdot x + G_m \cdot x^2$. In this case, $G_m$ denotes the correction coefficient (weight), and x denotes $|N|/|Q|$ or $|Q|/|N|$. As described above, off-track characteristics of the readback amplitude of the null servo pattern shown in FIG. 3 is characterized by the third-order component. Thus, the optimal correction coefficient $G_m$ for the third-order component is calculated as shown in FIGS. 6A, 6B, 6C and 6D. That is, as evaluation indices for the optimality, the results of searches for the optimal value are presented for four cases described below.

In a first case, as shown in FIG. 6A, the optimum correction coefficient minimizes the maximum value of an error in the true value of a demodulation value in one period of the magnetization pattern. In a second case, as shown in FIG. 6B, the optimum correction coefficient minimizes the rms (root mean square) value of an error in the true value of the demodulation value during one period of the magnetization pattern. In a third case, as shown in FIG. 6C, the optimum correction coefficient minimizes the maximum value of the absolute value of a position sensitivity (dB) during one period of the magnetization pattern. In a fourth case, as shown in FIG. 6D, the optimum correction coefficient minimizes the rms value of the absolute value of the position sensitivity (dB) during one period of the magnetization pattern.

When $a_3/a_1 > 1/9$, the Lissajous figure is recessed and reduces linearity correction accuracy. Thus, the reader 10R used desirably has such a sensitivity distribution as sets the range $0 < a_3/a_1 < 1/9$. Hence, least squares approximation with a straight line or a quadratic curve within the range ($0 < a_3/a_1 < 1/9$) results in approximation curves shown by dashed lines and alternate long and short dash lines in FIGS. 6A, 6B, 6C and 6D.

As described above, a rotation correction angle can be estimated in accordance with Formula (23). Similarly, for the linearity correction coefficient $G_m$, the optimal coefficient can be determined by allowing $a_3/a_1$ to be estimated (see FIGS. 6A, 6B, 6C and 6D). However, no correction coefficient has been determined during calibration in an actual process of manufacturing a disk drive, and thus the linearity is in an inappropriate state. Hence, the reader 10R cannot be physically positioned at regular intervals with respect to the magnetization pattern. That is, in an inappropriate state, the position indicated by the demodulation value is offset from the actual position and has a positional error relative to the actual position. Thus, the reader 10R is not correctly placed at the actual position. The amount of error (offset) depends on the actual position, and thus, offsetting the reader 10R at regular intervals based on demodulation values do not result in regular intervals for the actual physical positions. Thus, physically offsetting the reader 10R at regular intervals with respect to the magnetization pattern is required.

Figure 7:
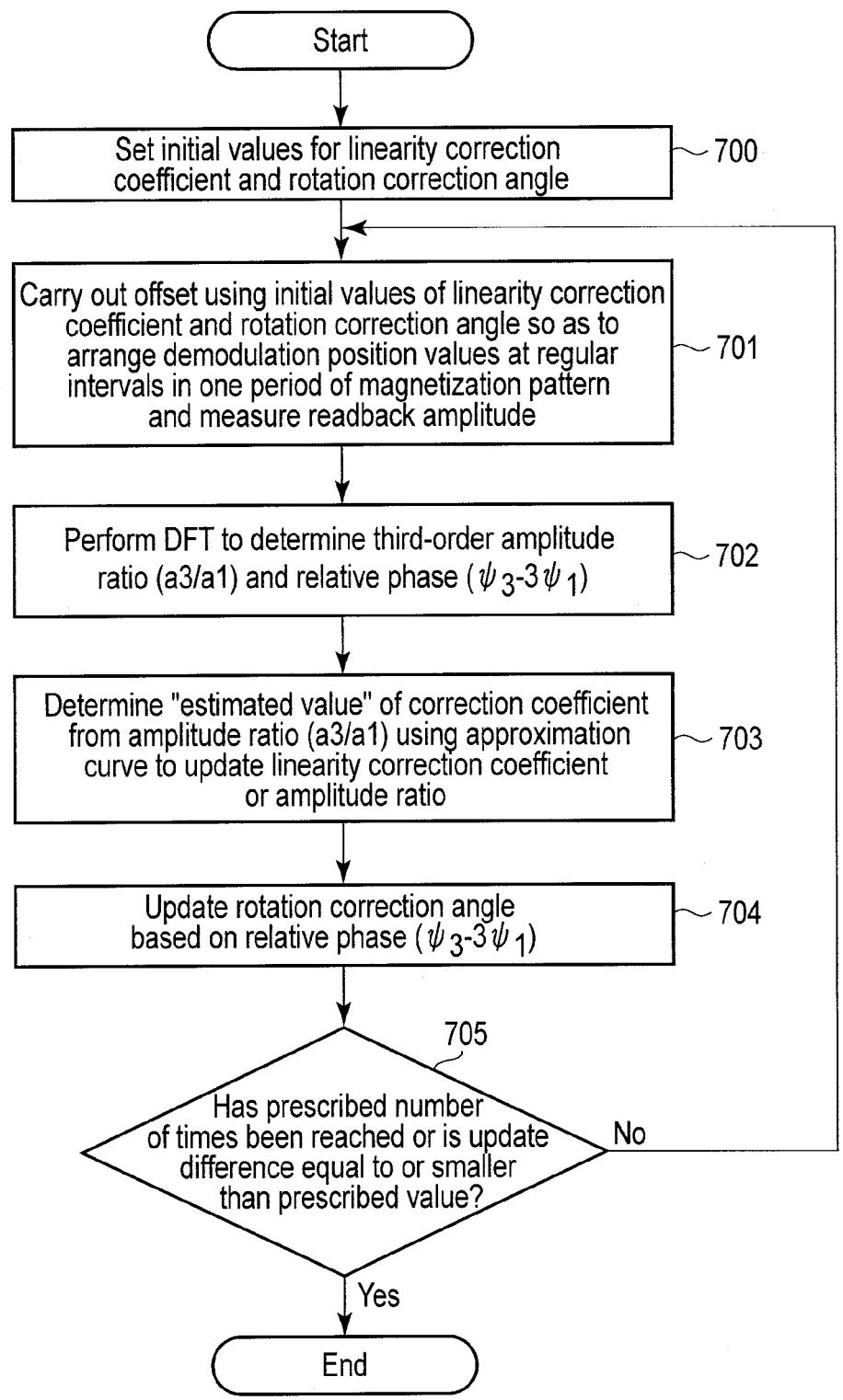
FIG. 7 is a flowchart illustrating a process for position demodulation according to the first embodiment.
Figures 12D, 12E, 12F:
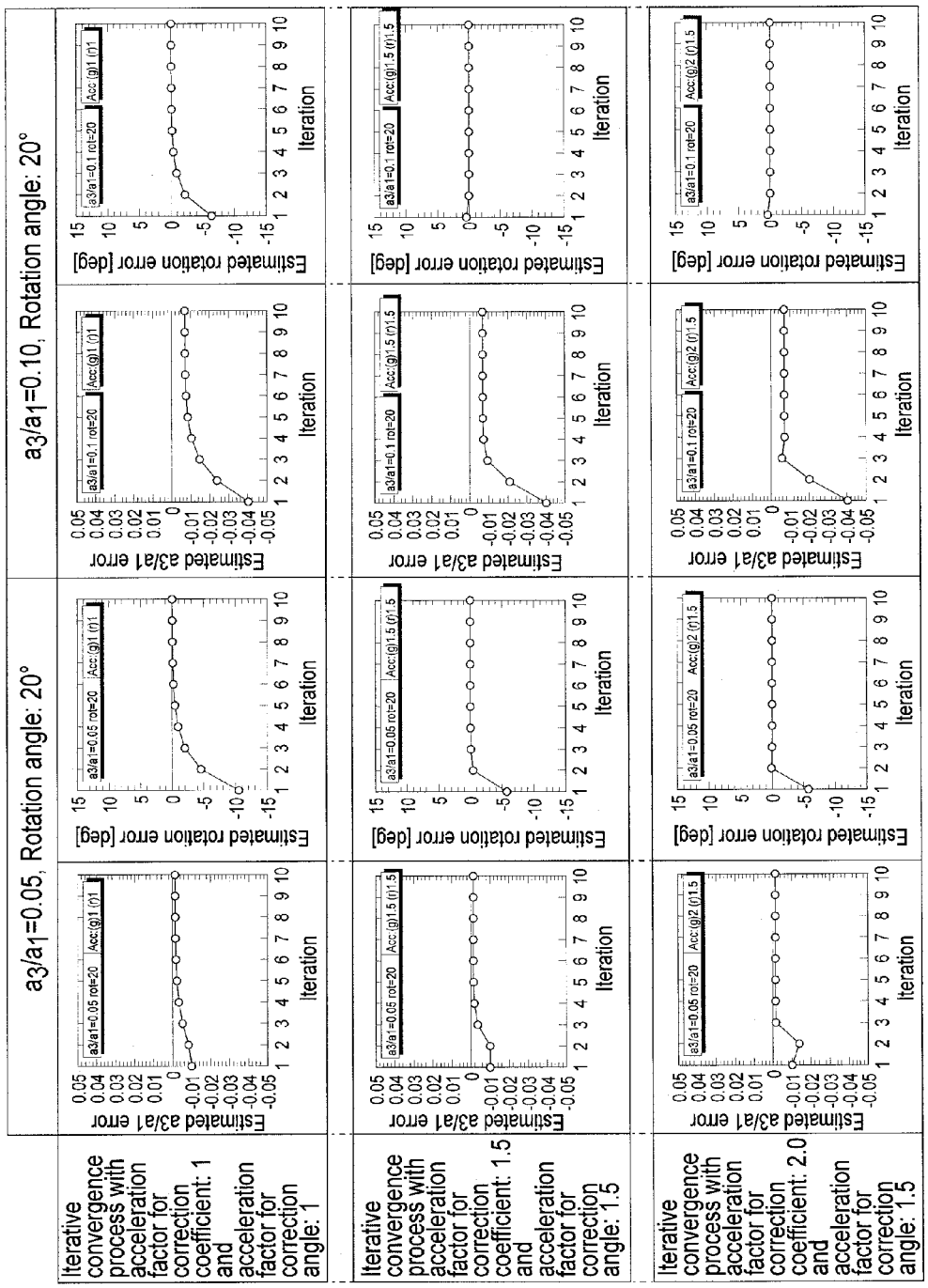

Thus, according to the present embodiment, the MPU 14 calculates the optimal correction coefficient by a correction process of repeating calibration. The calibration includes offsetting of the reader 10R and a DFT operation. FIG. 7 is a flowchart showing a procedure for calculating the optimum correction coefficient.

As shown in the flowchart in FIG. 7, the MPU 14 sets initial values for the linearity correction coefficient and the rotation correction angle (block 700). The MPU 14 uses the initial values to offset the reader 10R so that demodulation values (positions) in one period of the magnetization pattern are placed at regular intervals in the cross-track direction (x), and then measures the readback amplitude (N(x) or Q(x)) (block 701). Then, the MPU 14 performs a DFT operation on the readback amplitude in the cross-track direction to calculate the amplitude ratio ($a_3/a_1$) and relative phase ($\psi_3 - 3\psi_1$) of the first-order component and the third-order component (block 702).

Moreover, the MPU 14 determines an estimated value for the correction coefficient based on the amplitude ratio ($a_3/a_1$) using an approximation curve, and updates the linearity correction coefficient or the amplitude ratio based on the estimated value (block 703). That is, the MPU 14 calculates a relational expression updated value=acceleration factor×(estimated value−current value)+current value. The MPU 14 updates the rotation correction angle based on the relative phase ($\psi_3 - 4\psi_1$) (block 704). That is, the MPU 14 calculates a relational expression updated value=acceleration factor× relative phase/4+current value. The MPU 14 repeats the above-described process until the number of times that the process has been carried out reaches a prescribed value or until an update difference becomes less than or equal to a prescribed value (block 705). For convenience, ±π/4 in equation (23) is not referred to.

Thus, repeating the calibration allows an accurate first-order component and an accurate third-order component to be obtained in the DFT operation, allowing the optimal correction coefficient and the optimal rotation correction angle to be calculated. Thus, the linearity corrector 24 in the position demodulator 20 carries out a correction based on the optimal correction coefficient of the linearity correction function calculated by the MPU 14. Hence, the position demodulator 20 can achieve servo signal demodulation that demodulates an accurate position error signal (PES).

FIGS. 8A to 8F are diagrams showing an example of the process. FIGS. 8B and 8C show a demodulation value and a demodulation error at an initial correction coefficient before calibration and a demodulation value and a demodulation error at a correction coefficient resulting from 10 times of repeated calibration. A comparison between the values obtained before the calibration and the values obtained after the calibration indicates that the linearity of the demodulation value is improved, with the demodulation error reduced. A normal correction method as represented by acceleration factor=1 needs a process of repeating calibration about five to seven times until parameters converge. Thus, the present embodiment uses an acceleration factor that meets the relational factor updated value=acceleration factor×(estimated value−current value)+current value when the correction coefficient is revised (updated). Acceleration factor=1 corresponds to a normal update method without acceleration.

FIGS. 9A and 9B show an example of the number of convergences with respect to the acceleration factor according to the present embodiment. That is, FIGS. 9A an 9B are contour maps showing the number of convergences observed with the acceleration factor ηa for the linearity correction coefficient and the acceleration factor ηr for the rotation correction angle varying. Although the optimal acceleration factor varies slightly depending on the number of sample points during one period of the magnetization pattern, setting ηa≅2 and ηr≅1.5 allows convergence to be approximately achieved with one to about three times of calibration.

As is apparent from FIGS. 6A, 6B, 6C and 6D, the optimal value of the linearity correction coefficient monotonically increases approximately linearly relative to the amplitude ratio $(a_3/a_1)$. Thus, an update with an acceleration factor applied to the amplitude ratio $(a_3/a_1)$ instead of the linearity correction coefficient produces almost similar results. Furthermore, in the process shown in the flowchart of FIG. 7, the arithmetic operation updated value=acceleration factor×relative phase/4+current value is performed on the rotation correction angle. This is because the rotation correction carried out during the calibration allows estimated value−current value to be obtained by relative phase/4.

FIGS. 10A and 10B show an example of estimated residual errors in the optimal correction coefficient and the optimal rotation correction angle according to the present embodiment. The results in the four cases have been presented as the evaluation index for the optimality with reference to FIGS. 6A, 6B, 6C and 6D. As shown in FIGS. 10A and 10B, a comparison of a residual error (the difference between a true value and an estimated value) in the final correction value of the linearity correction indicates that appropriate update can be achieved by the approximation of the optimal correction coefficient $G_m = -0.352105 + 4.73869 \cdot (a_3/a_1) + 1.27441 \cdot (a_3/a_1)^2$, which minimizes the rms value, as shown in FIG. 6B.

Moreover, the offset in the DFT operation is desirably set by multiplying the magnetization pattern period by an integer n; one period of the magnetization pattern involves m points. However, on the assumption that a readback amplitude pattern is symmetric, the offset can be determined to be equal to half of the magnetization pattern period. Moreover, if data on both burst patterns N and Q is utilized at one offset point, the offset can be determined to be equal to quarter of the magnetization pattern period. Furthermore, to obtain the first- to third-order phases, the above-described value m needs to be 7 or larger, and an averaging effect increases consistently with the total number of measurement points m×n. However, for m=8, the symmetry of the correction function precludes the rotation angle from being specifically determined. Thus, m=8 is preferably avoided.

Since the present embodiment uses only the first- and third-order components of the results of the DFT operation, the DFT operation need not determine components of all orders. Specifically, on the assumption that m points are provided per magnetization pattern period, if amplitude data N[k] (k=0, 1, ..., n×m−1) is acquired at a total of n×m offset points equal to the magnetization pattern period multiplied by the integer n, the first and third orders can be expressed by:

Real part of the first-order component=(ΣN[k]×c[k] mod m])/(n×m/2)

Imaginary part of the first-order component=(>N[k]× s[k mod m])/(n×m/2)

Real part of the third-order component=(ΣN[k]×c[3×k mod m])/(n×m/2)

Imaginary part of the third-order component=(ΣN[k]× s[3×k mod m])/(n×m/2)

However, calculations c[k]=cos(2π×k/m) and s[k]=sin (2π×k/m) may be carried out. Furthermore, amplitude data results from a DFT operation performed on time domain data in the servo burst demodulator 120. A DFT operation that does not determine components of all orders is also referred to as a DFT operation for convenience.

Second Embodiment

Now, a servo demodulation operation according to a second embodiment will be described with reference to FIGS. 11A to 14B. The following are also applied to the present embodiment and will not be described: the configuration of the disk drive shown in FIG. 1, the configuration of the servo system shown in FIG. 2, the example of a null servo pattern shown in FIG. 3, the example of simulation shown in FIGS. 4A and 4B, and the example of Lissajous characteristics shown in FIGS. 5A and 5B.

The present embodiment is applied to a linearity correction function $\alpha N/(|N|+|Q|)+(1-\alpha)N|N|/(N^2+Q^2)$. In this case, α denotes a correction coefficient (weight), and N and Q denote readback amplitude values corresponding to null burst patterns N and Q. FIGS. 11A, 11B, 11C and 11D show an example of the optimal correction coefficient for the amplitude ratio $(a_3/a_1)$ according to the present embodiment. Like FIGS. 6A, 6B, 6C and 6D, described above, FIGS. 11A, 11B, 11C and 11D present the results of searches for optimal values for four cases, as evaluation indices for the optimality.

Figure 13A:
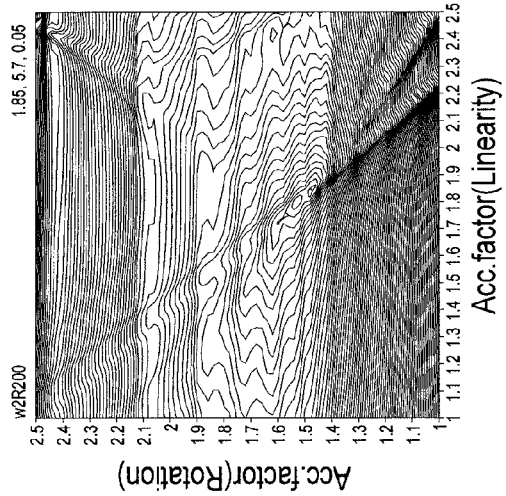
FIGS. 13A and 13B are diagrams illustrating examples of the number of convergences with respect to an acceleration factor according to the second embodiment.
Figure 13B:
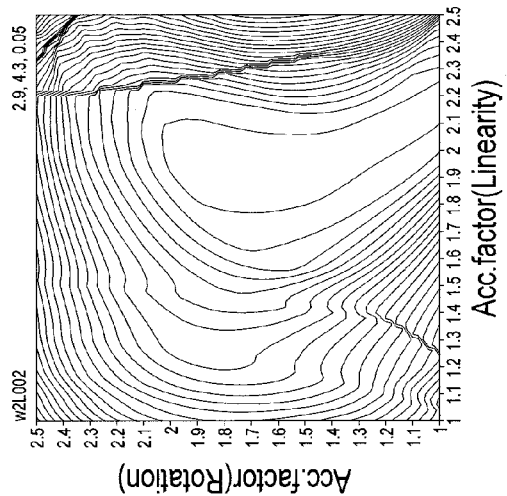
Figure 14A:
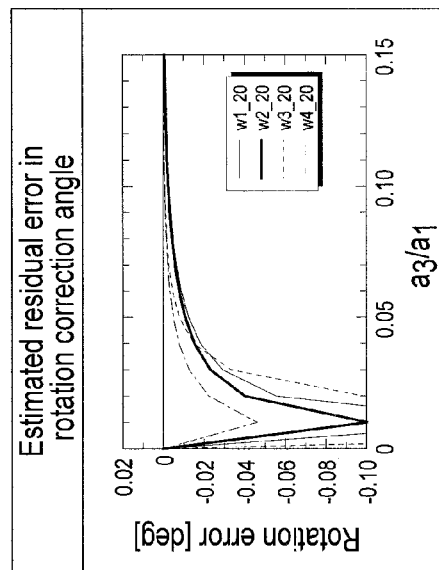
FIGS. 14A and 14B are diagrams illustrating examples of estimated residual errors in the optimal correction coefficient and in the optimal rotation correction angle according to the second embodiment.
Figure 14B:
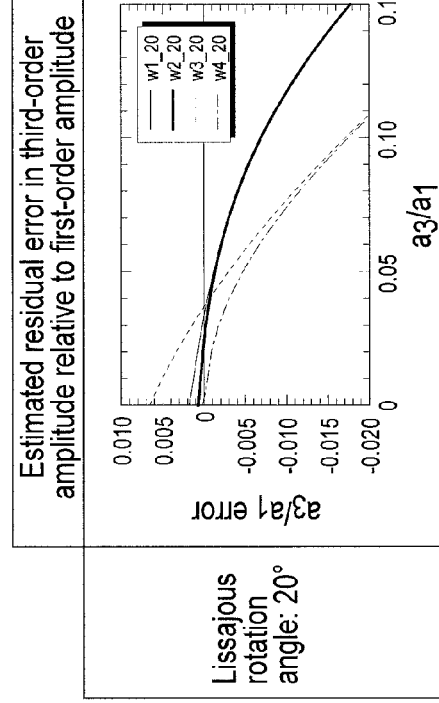

FIGS. 12A to 12F show an example of a process for determining the optimal correction coefficient and the optimal rotation correction angle according to the present embodiment. That is, also in the present embodiment, the MPU 14 can repeat calibration to obtain an accurate first-order component and an accurate third-order component in a DFT operation, thus calculating the optimal correction coefficient and the optimal rotation correction angle. Moreover, FIGS. 13A and 13B show examples of the number of convergences with respect to the acceleration factor according to the present embodiment. Furthermore, FIGS. 14A and 14B show examples of estimated residual errors in the optimal correction coefficient and the optimal rotation correction angle according to the present embodiment.

As described above, the linearity correction function applied to the present embodiment, like the correction function described in the first embodiment, can calculate the optimal correction coefficient and the optimal rotation correction angle. Thus, the linearity corrector 24 in the position demodulator 20 carries out a correction based on the optimal correction coefficient of the linearity correction function calculated by the MPU 14. Hence, the position demodulator 20 can achieve servo signal demodulation that demodulates an accurate position error signal (PES).

The present embodiment illustrates an example in which the optimal correction coefficient is calculated from the first- and third-order components. However, correction accuracy can be improved by taking a higher order such as the fifth order and the seventh order into account.

Third Embodiment

Now, a servo demodulation operation according to a third embodiment will be described with reference to FIGS. 15, 16A, 16B, 17A and 17B. The following are also applied to the present embodiment and will not be described: the configuration of the disk drive shown in FIG. 1, the configuration of the servo system shown in FIG. 2, the example of a null servo pattern shown in FIG. 3, the example of simulation shown in FIGS. 4A and 4B, and the example of Lissajous characteristics shown in FIGS. 5A and 5B.

The first embodiment is a method of calculating the optimal correction coefficient for a higher-order component by performing a DFT operation on the off-track characteristics of readback amplitude from the reader 10R. The present embodiment calculating the optimal correction coefficient for a higher-order component by performing a DFT operation on, instead of the readback amplitude from the reader 10R, the rate of change in readback amplitude in the off-track direction.

Figure 15:
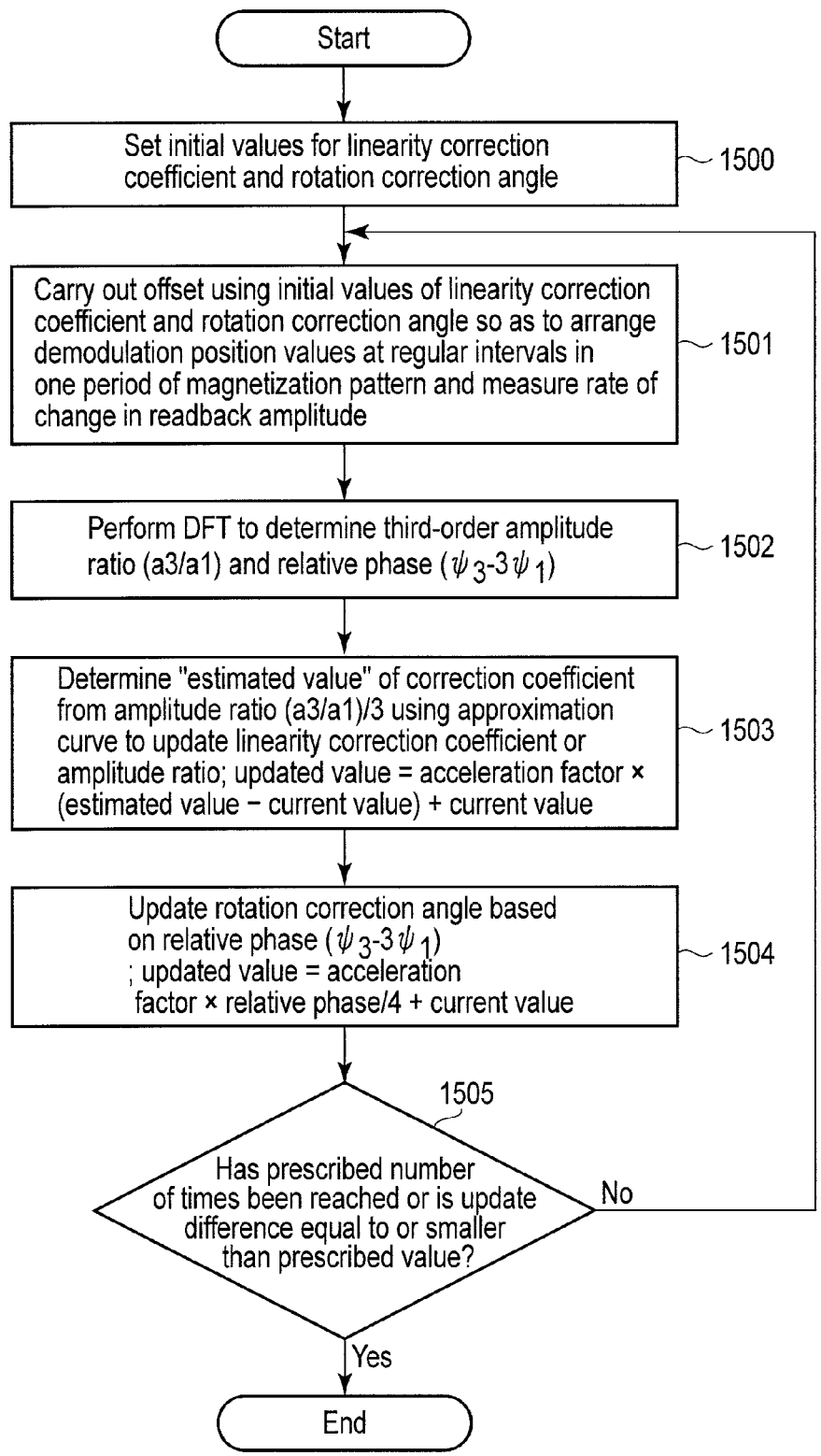
FIG. 15 is a flowchart illustrating a process for position demodulation according to a third embodiment.

Specifically, as shown in a flowchart in FIG. 15, the MPU 14 sets initial values for the linearity correction coefficient and the rotation correction angle (block 1500). The MPU 14 uses the initial values to offset the reader 10R so that demodulation values (positions) during one period of the magnetization pattern are placed at regular intervals in the cross-track direction (x), and then measures the rate of change in readback amplitude (N(x) or Q(x)) (block 1501). In this case, with the reader 10R placed at an offset position, the MPU 14 drives the VCM 4 in a controllable manner to vibrate the reader 10R at a very small amplitude in the cross-track direction, and then measures the displacement amplitude of the reader 10R. Alternatively, the MPU 14 may measure the vibration amplitude of the reader 10R in the N burst or Q burst in response to the current amplitude of the VCM 4 as a frequency response function FRF). Measuring the vibration amplitude as a frequency response function is expected to have the effect of removing noise.

Then, the MPU 14 performs a DFT operation on the rate of change in readback amplitude in the cross-track direction to calculate the amplitude ratio ($a_3/a_1$) and relative phase ($\psi_3 - 3\psi_1$) of the first-order component and the third-order component (block 1502). The rate of change in readback amplitude in the cross-track direction corresponds to a derivative (dN/dx) for the readback amplitude and is thus the value of a tripled third-order coefficient. Thus, the MPU 14 determines an estimated value for the correction coefficient based on 1/3 of the amplitude ratio ($a_3/a_1$) using an approximation curve, and updates the linearity correction coefficient or the amplitude ratio by using the estimated value (block 1503). That is, the MPU 14 calculates the relational expression updated value=acceleration factor×(estimated value−current value)+current value. In this case, the linearity correction coefficient multiplied by the order in accordance with the DFT operation is obtained, thus advantageously improving calculation accuracy for, for example, an error in the quantization of a high-order coefficient.

Moreover, the MPU 14 updates the rotation correction angle based on the relative phase ($\psi_3 - 3\psi_1$) (block 1504). That is, the MPU 14 calculates the relational expression updated value=acceleration factor×relative phase/4+current value. The MPU 14 repeats the above-described process until the number of times that the process has been carried out reaches a prescribed value or until the update difference becomes less than or equal to a prescribed value (block 1505).

Figures 16A, 16B:
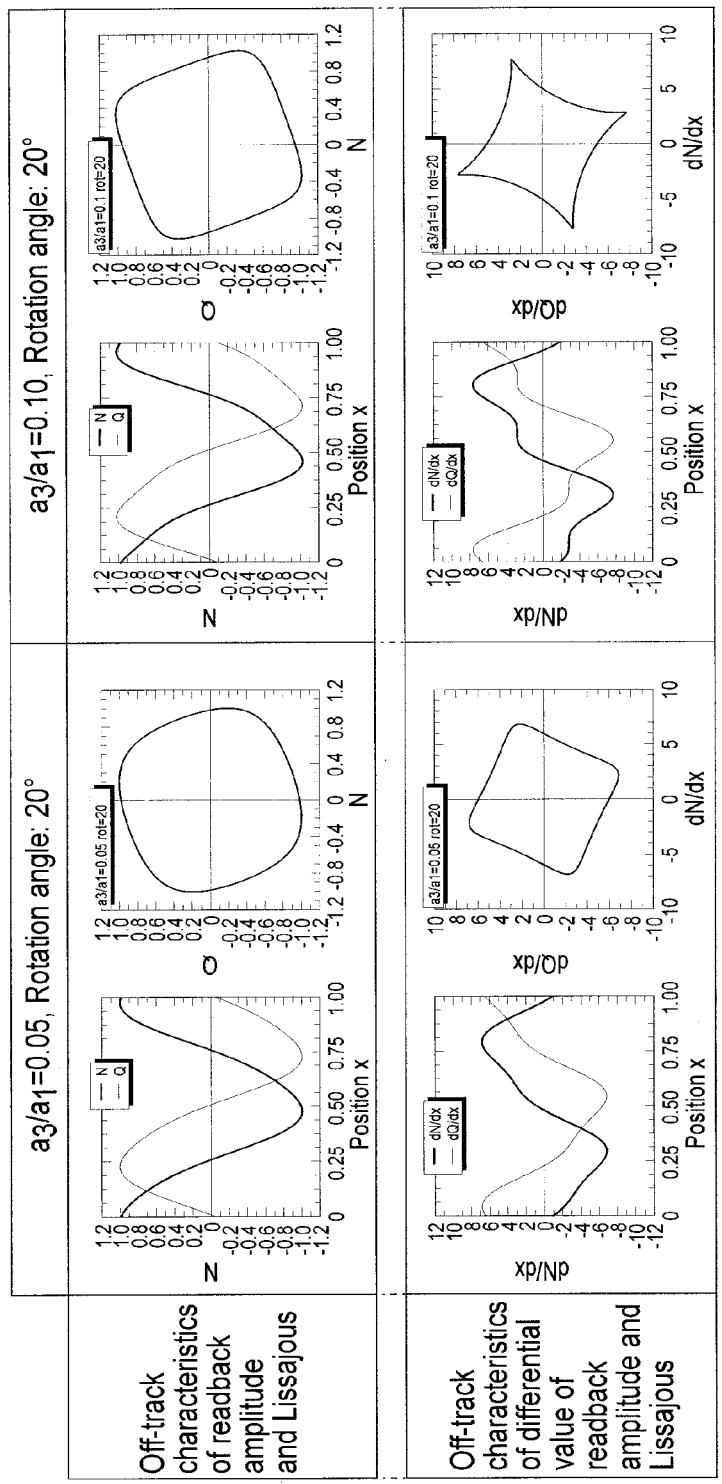

FIGS. 16A and 16B show a specific example in which calibration is carried out by the method according to the present embodiment, that is, an example of a process of determining the optimum correction coefficient and the optimum rotation correction angle. Unlike the above-described first and second embodiments, the present embodiment allows for sufficiently fast convergence even if the acceleration factor is approximately 1. Additionally, the use of a large acceleration factor as is the case with the first embodiment leads to a tendency to diverge.

Figure 17A:
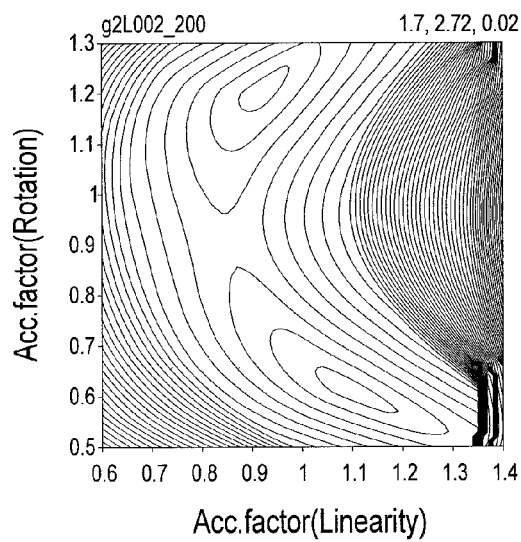
FIGS. 17A and 17B are diagrams illustrating examples of the number of convergences with respect to an acceleration factor according to the third embodiment.
Figure 17B:
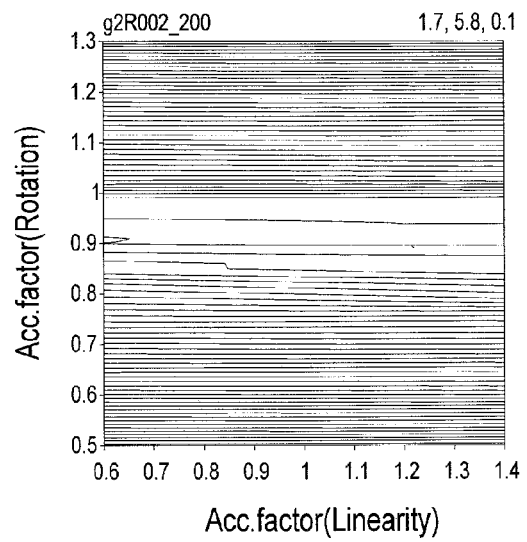

Furthermore, FIGS. 17A and 17B show an example of the number of convergences residual error in acceleration factor according to the present embodiment. That is, FIGS. 17A and 17B are contour maps showing the number of convergences observed with the acceleration factor $\eta a$ for the linearity correction coefficient and the acceleration factor $\eta r$ for the rotation correction angle varying. The number of times that the linearity correction coefficient converges has the minimum value at $\eta a=1.1$ and $\eta r=0.6$ but does not substantially vary within the ranges $\eta a=0.8$ to 1.1 and $\eta r=0.6$ to 1.2. On the other hand, the number of times that the rotation correction angle converges does not substantially depend on $\eta a$ but has the minimum value within the range $\eta r=0.8$ to 1.0. As described above, the optimal acceleration factors are $\eta a=0.8$ to 1.1 and $\eta r=0.8$ to 1.0. In addition, in the above-described first embodiment, the Lissajous rotation angle cannot be determined for m=8, but the present embodiment is applicable to m=8.

As described above, the calibration method according to the present embodiment is a method of updating the linearity correction coefficient or amplitude ratio using N (or Q) or the rate of change in N (or Q) (dN/dx). Thus, the present embodiment focuses on a characteristic of readback amplitude which causes nonlinearity to determine a weight based on the correlation between the characteristic and the optimal weight (correction coefficient).

In short, like the correction function described in the first embodiment, even the linearity correction coefficient applied to the present embodiment allows the optimal correction coefficient and the optimal rotation correction angle to be calculated. Thus, the linearity correction section 24 in the position demodulator 20 carries out a correction based on the optimal correction coefficient for the linearity correction function calculated by the MPU 14. Hence, the position demodulator 20 can achieve servo signal demodulation that demodulates an accurate position error signal (PES).

Fourth Embodiment

Now, a servo demodulation operation according to a fourth embodiment will be described with reference to FIGS. 18A, 18B, 18C, 18D, 19A, 19B, 20A and 20B. The following are also applied to the present embodiment and will not be described: the configuration of the disk drive shown in FIG. 1, the configuration of the servo system shown in FIG. 2, the example of a null servo pattern shown in FIG. 3, the example of simulation shown in FIGS. 4A and 4B, and the example of Lissajous characteristics shown in FIGS. 5A and 5B.

The above-described first and second embodiments are applied to the linearity correction function that can be defined by a single parameter. The present embodiment is applicable to a linearity correction function defined by a plurality of parameters. An example of the linearity correction function defined by a plurality of parameters is a second-order correction formula expanded to a third order, which can be expressed by:

$$p = g_1 \times r + g_2 \times r^2 + g_3 \times r^3, g_1 + g_2 + g_3 = 1 \quad (24)$$

where r=|Q|/|N| when |N|>|Q| and r=|N|/|Q| when |N|<|Q|. This linearity correction function can be considered to be, for example, Formula (7) in U.S. Pat. No. 7,312,946 to which a constraint $a_0=0$ and $a_1+a_2+a_3=1$ is added. The constraint condition sets an independent parameter 2.

FIGS. 18A, 18B, 18C and 18D show the optimal correction coefficient for the amplitude ratio ($a_3/a_1$) according to the present embodiment. Although not shown in the drawings, a demodulation error corrected by the optimal correction coefficient is smaller than a demodulation error corrected by a second-order formula. As is apparent from FIGS. 18A, 18B, 18C and 18D, the optimal value of the linearity correction coefficient is not so linear with respect to the amplitude ratio ($a_3/a_1$) and does not increase or decrease monotonically. Thus, the acceleration factor may be updated by being applied to a single amplitude ratio ($a_3/a_1$) rather than to a plurality of linearity correction coefficients.

FIGS. 19A to 19E show an example of a process of determining the optimal correction coefficient and the optimal rotation correction angle according to the present embodiment. As is apparent from FIGS. 19A to 19E, $a_3/a_1=0.2$, which is difficult to correct according to the above-described first embodiment, can be sufficiently corrected according to the present embodiment. Thus, the present embodiment can use a plurality of correction parameters to easily carry out calibration for obtaining the optimal correction coefficient, which is difficult with the conventional search type.

FIGS. 20A and 20B show an example of the number of convergences with respect to the acceleration factor according to the present embodiment. That is, FIGS. 20A and 20B show contour maps of the number of convergences with respect to the acceleration factor for the linearity correction coefficient applied to the amplitude ratio ($a_3/a_1$) and the rotation correction angle.

In short, like the correction function described in the first embodiment, even the linearity correction coefficient applied to the present embodiment allows the optimal correction coefficient and the optimal rotation correction angle to be calculated. Thus, the linearity correction section 24 in the position demodulator 20 carries out a correction based on the optimal correction coefficient for the linearity correction function calculated by the MPU 14. Hence, the position demodulator 20 can achieve servo signal demodulation that demodulates an accurate position error signal (PES).

Fifth Embodiment

Now, a servo demodulation operation according to a fifth embodiment will be described with reference to FIGS. 21, 22A, 22B, 23A, 23B, 23C, 24A, 24B and 24C. The following are also applied to the present embodiment and will not be described: the configuration of the disk drive shown in FIG. 1, the configuration of the servo system shown in FIG. 2, the example of a null servo pattern shown in FIG. 3, the example of simulation shown in FIGS. 4A and 4B, and the example of Lissajous characteristics shown in FIGS. 5A and 5B.

FIGS. 4A and 4B described above show an example in which the center of NQ Lissajous is offset. The Lissajous offset is assumed to be principally caused, in the disk drive shown in FIG. 1, by a transient response of a transmission channel comprising the reader 10R, the head amplifier IC 11, and the read channel 12R. FIG. 21 shows an example of a waveform with superimposed transient responses.

In a disk drive adopting perpendicular magnetic recording, a DC magnetic field changes at a burst boundary of a null servo pattern as shown in FIG. 3. Thus, if the transmission channel is a first-order lag system, then as a transient response with a time constant τ, a signal $\exp(-t/\tau)$ is added to a readback signal for the null servo pattern as additive noise as shown in FIG. 21. In sampling the resultant signal by a DFT operation, the read channel 12R provides a delay of one or two wavelengths for the sampling in order to eliminate the influence of the burst boundary of the null servo pattern.

Circular points shown in FIG. 21 represent DFT sample points obtained by sampling eight wavelengths by a DFT operation at the rate of eight samples per wavelength with a delay of one wavelength introduced into the signal. As described above, to demodulate a null servo pattern, the servo burst demodulator 120 performs a DFT operation on each of the burst patterns N and Q and uses only the resultant real parts for demodulation.

FIGS. 22A and 22B show Lissajous figures obtained before and after a correction according to the present embodiment. As shown in FIG. 22B, a Lissajous figure obtained if transient response noise at the same level is added to both burst patterns N and Q is offset upward and rightward. If the readback signal contains no noise or sampling frequency deviation, no value appears in the imaginary part of the DFT operation. However, if noise is added to the readback signal, both the real part and the imaginary part are affected.

Moreover, FIGS. 23A, 23B, 23C, 24A, 24B and 24C show the correction coefficient according to the present embodiment. As shown in FIGS. 23C and 24C, when a DFT operation $\exp(-(t+\text{delay})/\tau)$ is performed if additive noise is present, the ratio between the real part and the imaginary part is determined by the time constant τ. The time constant τ is expected to be approximately determined by the transmission channel and to be unchanged. Thus, the servo burst demodulator 120 pre-measures the time constant τ and stores the corresponding ratio between the real part and the imaginary part shown in FIG. 23C or 24C. During demodulation, the servo burst demodulator 120 carries out a process of calculating the imaginary part along with the real part by a DFT operation, and for each of the burst patterns N and Q, subtracting the imaginary part multiplied by the stored ratio from the real part. This enables a correction of a Lissajous offset shown in FIG. 22B.

As shown in FIGS. 23C and 24C, the ratio between the real part and the imaginary part is determined by the time constant τ normalized by the wavelengths of the burst patterns and the number of samplings per wavelength in the DFT operation. The ratio does not depend on a sample delay or a sample wavenumber associated with the DFT operation.

In the above-described present embodiment, cosine components are sampled as shown in FIG. 21. For a system configured to sample sine components, the real part (cosine components) may be replaced with the imaginary part (sine components).

As described above, the embodiments enables accurate execution of position demodulation involving demodulating a null servo pattern from a readback signal read by the reader and correcting the resultant demodulation signal to demodulate a position error signal (PES) indicative of the position of the reader. In particular, the optimal correction coefficient needed for a linearity correction for position demodulation can be accurately calculated in a short time. Thus, servo signal demodulation that demodulates an accurate position error signal can be achieved without making the linearity correction insufficient or excessive.

The first to fourth embodiments and the process of determining a correction coefficient according to the fifth embodiment are carried out during a calibration step included in the steps of manufacturing a disk drive. However, the process is applicable to a case where a calibration process is carried out inside the disk drive shipped as a product.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage apparatus comprising:
a disk with a servo pattern recorded thereon; and
a processor, wherein the processor is configured to:
generate a position error signal based on the servo pattern included in readback signals read by a reader;
offset the reader in a cross-track direction on the disk and perform a discrete Fourier transform (DFT) operation on an amplitude data sequence of the readback signals with respect to the cross-track direction; and
calculate an optimal correction coefficient for a linearity correction function used for a linearity correction of the position error signal based on a result of the DFT operation.

2. The data storage apparatus of claim 1, wherein the processor performs the DFT operation on amplitude values obtained when the reader is offset to a plurality of positions in the cross-track direction or a rate of change in the amplitude values to the offset with respect to a period of the servo pattern.

3. The data storage apparatus of claim 1, wherein the processor calculates the optimal correction coefficient from a ratio of a third-order component amplitude to a first-order component amplitude based on the result of the DFT operation.

4. The data storage apparatus of claim 1, wherein the processor uses a linearity correction function $(1-G_m) \cdot x + G_m \cdot x^2$ ($G_m$: correction coefficient, x: |N|/|Q| or |Q|/|N|, and N and Q: readback amplitude values corresponding to servo patterns N and Q) as the linearity correction function.

5. The data storage apparatus of claim 1, wherein the processor uses a linearity correction function $\alpha N/(|N|+|Q|)+(1-\alpha)N|N|/(N^2+Q^2)$ ($\alpha$: correction coefficient and N and Q: readback amplitude values corresponding to servo patterns N and Q) as the linearity correction function.

6. The data storage apparatus of claim 3, wherein the processor updates the optimal correction coefficient or the ratio based on an acceleration factor.

7. The data storage apparatus of claim 1, wherein the processor calculates a rotation correction angle used for a rotation correction by an angle of rotation corrector included in the position demodulator, from a relative phase of a third-order component relative to a first-order component based on the result of the DFT operation.

8. The data storage apparatus of claim 7, wherein the processor updates the rotation correction angle based on an acceleration factor.

9. The data storage apparatus of claim 1, wherein the processor sets initial values for a linearity correction coefficient and a rotation correction angle,
uses the initial values to measure the amplitude value read by the reader,
performs the DFT operation on the measured amplitude value,
calculates a ratio of a third-order component amplitude to a first-order component amplitude and a relative phase of the third-order component relative to the first-order component based on the result of the DFT operation, and
updates the linearity correction coefficient based on the ratio to calculate the optimal correction coefficient.

10. A method for servo demodulation in a data storage apparatus, the method comprising:
generating a position error signal based on a servo pattern included in readback signals read by a reader;
offsetting the reader in a cross-track direction on a disk and performing a discrete Fourier transform (DFT) operation on an amplitude data sequence of the readback signals with respect to the cross-track direction; and
calculating an optimal correction coefficient for a linearity correction function used for a linearity correction of the position error signal based on a result of the DFT operation.

11. The method of claim 10, further comprising:
performing the DFT operation on amplitude values obtained when the reader is offset to a plurality of positions in the cross-track direction or a rate of change in the amplitude values to the offset with respect to a period of the servo pattern.

12. The method of claim 10, further comprising:
calculating the optimal correction coefficient from a ratio of a third-order component amplitude to a first-order component amplitude based on the result of the DFT operation.

13. The method of claim 10, further comprising:
using a linearity correction function $(1-G_m) \cdot x + G_m \cdot x^2$ ($G_m$: correction coefficient, x: |N|/|Q| or |Q|/|N|, and N and Q: readback amplitude values corresponding to servo patterns N and Q) as the linearity correction function.

14. The method of claim 10, further comprising:
using a linearity correction function $\alpha N/(|N|+|Q|)+(1-\alpha)N|N|/(N^2+Q^2)$ ($\alpha$: correction coefficient and N and Q: readback amplitude values corresponding to servo patterns N and Q) as the linearity correction function.

15. The method of claim 12, further comprising:
updating the optimal correction coefficient or the ratio based on an acceleration factor.

16. The method of claim 10, further comprising:
calculating a rotation correction angle used for a rotation correction by an angle of rotation corrector included in the position demodulator, from a relative phase of a third-order component relative to a first-order component based on the result of the DFT operation.

17. The method of claim 16, further comprising:
updating the rotation correction angle based on an acceleration factor.

18. The method of claim 10, further comprising:
setting initial values for a linearity correction coefficient and a rotation correction angle;
using the initial values to measure the amplitude value read by the reader;
performing the DFT operation on the measured amplitude value;
calculating a ratio of a third-order component amplitude to a first-order component amplitude and a relative phase of the third-order component relative to the first-order component based on the result of the DFT operation; and
updating the linearity correction coefficient based on the ratio to calculate the optimal correction coefficient.

* * * * *